US008108321B2

(12) United States Patent
Neal et al.

(10) Patent No.: US 8,108,321 B2
(45) Date of Patent: Jan. 31, 2012

(54) SYSTEM AND METHOD FOR SHIPPING AND DELIVERING PARCELS TO A VIRTUAL ADDRESS

(75) Inventors: Thomas Neal, Cambridge, MA (US); Filippo Beretta, Cambridge, MA (US); Jorge Calzada, Cambridge, MA (US); Tito Costa, Cambridge, MA (US)

(73) Assignee: Urbissimo, Inc., Boston, MA (US)

( * ) Notice: Subject to any disclaimer, the term of this patent is extended or adjusted under 35 U.S.C. 154(b) by 824 days.

(21) Appl. No.: 11/649,781

(22) Filed: Jan. 5, 2007

(65) Prior Publication Data
US 2007/0192191 A1 Aug. 16, 2007

Related U.S. Application Data

(60) Provisional application No. 60/758,475, filed on Jan. 12, 2006, provisional application No. 60/758,498, filed on Jan. 12, 2006.

(51) Int. Cl.
G06Q 30/00 (2012.01)
(52) U.S. Cl. ......... 705/330; 705/332; 705/337; 705/338
(58) Field of Classification Search .................. None
See application file for complete search history.

(56) References Cited

U.S. PATENT DOCUMENTS

| 6,882,269 | B2 * | 4/2005 | Moreno | 340/5.73 |
| 7,043,690 | B1 * | 5/2006 | Bates et al. | 715/234 |
| 7,213,748 | B2 * | 5/2007 | Tsuei et al. | 235/380 |
| 2002/0147919 | A1 * | 10/2002 | Gentry | 713/200 |
| 2004/0107111 | A1 * | 6/2004 | Barts et al. | 705/1 |
| 2004/0128254 | A1 * | 7/2004 | Pintsov | 705/62 |
| 2004/0254893 | A1 * | 12/2004 | Tsuei et al. | 705/74 |
| 2005/0114664 | A1 * | 5/2005 | Davin | 713/170 |
| 2005/0192913 | A1 * | 9/2005 | Lubart | 705/406 |
| 2005/0199717 | A1 * | 9/2005 | Park et al. | 235/385 |
| 2005/0288986 | A1 * | 12/2005 | Barts et al. | 705/9 |
| 2006/0129543 | A1 * | 6/2006 | Bates et al. | 707/3 |
| 2007/0088749 | A1 * | 4/2007 | Lorch et al. | 707/104.1 |
| 2007/0299792 | A1 * | 12/2007 | Pintsov et al. | 705/402 |

FOREIGN PATENT DOCUMENTS

| FR | 2 563 987 A1 | 11/1985 |
| WO | WO 01/31827 A2 | 5/2001 |
| WO | WO 03/023688 A2 | 3/2003 |

OTHER PUBLICATIONS

"Mortal combat plans", Precision Marketing, Dec. 5, 1994.*
Supplementary European Search Report, Apr. 13, 2010.

* cited by examiner

Primary Examiner — Rutao Wu
(74) Attorney, Agent, or Firm — Hyra IP, PLC; Clifford D. Hyra

(57) ABSTRACT

A computer-based system and method for shipping and delivering a parcel, including reserving a terminal for a parcel; placing the parcel in the terminal, the parcel having a virtual delivery address of a recipient; picking up the parcel by a carrier; converting, through a central computer system, the virtual address into a postal address; delivering the parcel to a destination terminal drop-box corresponding to the postal address; notifying the recipient of the delivery of the parcel; and unlocking the drop-box only upon verifying the recipient's identity.

47 Claims, 15 Drawing Sheets

SYSTEM AND METHOD FOR SHIPPING AND DELIVERING PARCELS TO A VIRTUAL ADDRESS

CROSS-REFERENCE TO RELATED APPLICATIONS

This application is based upon and claims priority from U.S. provisional patent application Nos. 60/758,475 and 60/758,498, both filed Jan. 12, 2006, the contents of both applications being incorporated herein by reference, in their entirety.

BACKGROUND

Postal systems have existed in all human civilizations as a standardized and efficient way to enable transportation of items of limited size and weight (letters and packages) between individuals and institutions. Focusing on parcel delivery and disregarding mail and also referring to FIGS. 1 and 7, a typical postal transaction includes the following: a sending party ("sender" 700); an object to be transported ("parcel"); a postal service organization ("carrier" 704); a receiving party ("recipient" 706); a standardized format used by the recipient to inform the sender of the location where the parcel should be transported to ("address"). Usually a parcel postal method occurs as follows: the sender 700 desiring to ship a parcel inscribes the recipient's address on the parcel and then hands the parcel off to the carrier 704, often after traveling a significant distance to take the parcel to the nearest carrier's terminal 702. The carrier 704 can be the U.S. Postal Service, the United Parcel Service, Federal Express, or the like. The terminal 702 can be a carrier's drop-point or office, or can be a drop box. If the carrier 704 is not open for business when the sender 700 arrives, the sender 700 may have to return home and try again at a later time or date. If the carrier 704 is open, then a financial transaction is conducted whereby the sender 700 pays in advance for shipping and delivering the parcel. The carrier 704, based on the information encoded in the address, transports the parcel to the recipient's delivery location and attempts delivery. More recently the carriers 704 have begun to offer a service where they travel to the sender's address to pick up the parcel for shipping. However, this method is very manpower intensive and requires either that the sender 700 be available at the address for a large window of time or that an expensive fee is levied on the sender 700 if a smaller window is desired.

Postal addresses typically include the recipient's name, organization (if applicable), and information about the physical location of the delivery destination, such as street, street number, unit or apartment number (if applicable), city, state, and optionally nation. Such information can also be encoded in standardized alphanumerical representations, such as a zip code or postal code, which simplify the delivery method and allow for better error correction. Postal addresses are typically inscribed using both human-readable and machine-readable forms through the use of a variety of encoding techniques, such as bar codes. If a recipient 706 has more than one possible delivery location, one address is required for each delivery location. For example, a recipient 706 might have a "home address" for her residence and an "office address" for her business. Under conventional, or legacy, shipping and delivery systems, the sender 700 must provide a single delivery address at the time the parcel is dropped off with the carrier 704 and/or at the terminal 702.

Focusing on the last segment of the delivery chain and referring also to FIG. 2, current parcel delivery services suffer from many potential problems, especially when dealing with residential (i.e. non-business) recipients 706. These problems include, but are not limited to:

The recipient 706 might not be available when delivery is attempted, for a variety of reasons. With residential deliveries, since the parcels arrive during business hours, often the recipient 706 is at work instead of being at home. Additionally, the recipient 706 might be temporarily elsewhere, or the recipient 706 might have moved to a new address and failed to notify such action to the sender 700 and/or the carrier 704. As a result, the delivery has to be attempted again until the recipient 706 is found or for a limited number of times, as shown in steps 216-222. Alternatively or consequently, the parcel can be returned to the sender 700 as in step 224, or the parcel can be left on the exterior of recipient's premises, thus endangering the security, privacy and reliability of the transaction. All these problems cause extra costs to the carrier 704 and potential inconvenience or damage to the recipient 706.

Even if the recipient 706 is present, the time required to complete the delivery can fluctuate widely. Both its average length and the variance of this length are a source of cost and complexity for carriers 704. Particularly in the case of a residential (i.e. non-business) recipient 706, these problems are normally exacerbated by the limited numbers of parcels dropped at each location and by the long average distance traveled by carriers 704 to reach the recipient's premises.

Additional delivery services such as "signature for reception" and "cash on delivery" are extremely expensive for carriers 704 and inconvenient for recipients 706 because they are synchronous; i.e., in order to complete such services and effect delivery, the carrier's agent and the recipient 706 must be in the same place at the same time. Analogous (but inverse) problems exist when focusing on the first segment of the postal chain. The shipping method usually taxes the sender 700 with tedious activities such as going to a "shipping point" 702 (i.e. a post office or a retail store operated by a private carrier or a shared drop-box placed on the territory) or waiting for a scheduled pick-up.

As described above, a postal address embeds one single delivery preference of the recipient 706 and clearly discloses the physical location of the preferred delivery destination. Because of this characteristic, postal addresses suffer from a variety of limitations that cannot be directly overcome. For example:

If a recipient 706 has multiple addresses, the recipient 706 must inform the sender 700 about the one address that should be used for each shipment. If the physical location of one delivery destination changes, the recipient 706 must inform all potential senders 700 by issuing a new address. For example, if a user moves to a new residence, she must inform all potential senders 700 by giving them a new "home address." In order to enable a sender 700 to ship, a recipient 706 must reveal the physical location of the delivery destination. For example, if a recipient 706 wants to have a mail piece delivered to her residence, she must disclose the physical location of her residence (e.g. by giving her "home address" to the sender 700). Once a sender 700 knows the recipient's address, the recipient 706 can not prevent the sender 700 from shipping a parcel to the recipient 706. The recipient 706 might be able to reject a letter or parcel, but the item has first to be transported all the way to the delivery destination.

SUMMARY

Exemplary embodiments are directed to a computer-based method for shipping and delivering a parcel, including reserving a terminal for a parcel; placing the parcel in the terminal, the parcel having a virtual delivery address of a recipient; picking up the parcel by a carrier; converting, through a central computer system, the virtual address into a postal address; delivering the parcel to a destination terminal drop-box corresponding to the postal address; notifying the recipient of the delivery of the parcel; and unlocking the drop-box only upon verifying the recipient's identity.

Alternate embodiments provide a method for shipping a parcel, including reserving a terminal for placing a parcel to be shipped; accessing a terminal for placing the parcel; securing the parcel in the terminal; automatically notifying a carrier that the parcel has been placed in the terminal for pick up and shipment; picking up, by the carrier, the parcel from the terminal; scanning the parcel at the terminal; sending a notification that the carrier has picked up the parcel from the terminal; computing an estimated time of arrival of the parcel at a destination; transporting the parcel to a destination terminal based on a virtual address; securing the parcel to the destination terminal; and notifying a recipient that the parcel is available for pick up.

An additional embodiment is also directed to a method for delivering a parcel to a user, including reserving a terminal drop-box for receiving a parcel to be delivered; identifying the carrier at the terminal; identifying the parcel to be delivered at the terminal; automatically opening the drop-box based on the identification of the parcel; securing the parcel in the opened drop-box; and automatically notifying the recipient of the receipt of the parcel at the terminal.

A further embodiment is directed to a method for transporting a parcel, including reserving a drop-box at a terminal; identifying a valid sender to access the reserved drop-box, whereby the sender can place a parcel in the drop-box; identifying a valid carrier to access the reserved drop-box, whereby the carrier can pick-up the parcel; communicating to the sender that the parcel has been picked up; transporting the parcel to a destination terminal according to a virtual address on the parcel; identifying a valid carrier to access the destination terminal, whereby the carrier can place the parcel at the destination terminal; communicating to a recipient that the parcel has been delivered; and identifying the valid recipient to access the drop-box, whereby the recipient can pick up the parcel.

Another embodiment is directed to a system for shipping and delivering parcels, including a processor configured to control the shipping and delivering of one or more parcels; a terminal for receiving a parcel to be shipped; one or more boxes within each terminal for securing one or more parcels being shipped, each box having a locking door; a locking key for securing the parcel in the box; a scanner for identifying the parcel; a control unit for communicating with the processor and with the boxes; and a central computer system for notifying senders, carriers, and recipients the status of the parcel during the parcel's transportation from the sender to the recipient.

Exemplary embodiments are also directed to a terminal for securing parcels to be shipped and delivered, including one or more drop-boxes, each drop-box comprising a space for receiving one or more parcels; a door for securing the space against unauthorized access; a sensor for recognizing when a parcel has been placed in the space; and a locking device for securing the door against unauthorized opening; a scanning device for identifying a parcel; a user interface for identifying a sender, a carrier, or a recipient seeking to access a drop-box; and a communications device for communicating with a central computer system.

Alternative embodiments provide a computer system encoded with computer software, which, when executed by a computer, provide for the shipment and delivery of a parcel, wherein the computer software is provided for reserving a terminal for a parcel, the parcel having the virtual address of a recipient; notifying a carrier that the parcel has been placed in the terminal; converting, through a central computer system, the virtual address into a postal address; computing, based on the virtual address, the transportation of the parcel to a destination terminal drop-box; notifying the recipient of the delivery of the parcel to the destination terminal drop-box; and unlocking the destination drop-box only upon verifying the recipient's identity.

An additional embodiment is also directed to a computer-based system for shipping and delivering a parcel to a recipient, including means for reserving a drop-box at a terminal for receiving a parcel to be shipped to a recipient, the parcel having a virtual address; means for locking the drop-box after the parcel has been placed therein; means for notifying a carrier that the parcel is ready for pick up for shipping; means for notifying a central computer system that the parcel has been picked up by the carrier; means for translating the virtual address to a traditional address; means for instructing the transportation of the parcel to the traditional address; and means for notifying the recipient that the parcel is available for pick up at a terminal corresponding to the traditional address.

A further embodiment is directed to an entity-relationship database structure, including a delivery options table; a recipients table; a black-list table; an address table; and a senders table, wherein the tables of the database structure interact to control delivery of a parcel from a sender to a recipient.

Another embodiment is directed to a computer-based method for shipping a parcel, including receiving a parcel for shipment to a recipient, the parcel having a virtual address; converting the virtual address into a postal address; transporting the parcel to a destination terminal based on the postal address; securing the parcel in the destination terminal; and notifying the recipient that the parcel is available for pick up.

Exemplary embodiments are also directed to a computer-based method for shipping a parcel, including reserving a terminal for a parcel; securing the parcel in the terminal; automatically notifying a carrier that the parcel is ready for pick up; picking up the parcel from the secured terminal by use of a digital unlocking key; automatically notifying a sender that the parcel has been picked up; and transporting the parcel to a delivery address.

Alternate embodiments are directed to a computer-based method for delivering a parcel, including receiving a parcel for shipment to a recipient, the parcel having a virtual delivery address; converting the virtual delivery address into a postal address; transporting the parcel to a destination terminal based on the postal address; securing the parcel in the destination terminal; and notifying the recipient that the parcel is available for pick up.

An additional embodiment is directed to a computer-based method for shipping and delivering a parcel, including reserving, by a sender, a terminal for a parcel, wherein the parcel is to be picked up by a recipient; locking the parcel in the terminal; automatically notifying the recipient, through a central computer system, that the parcel has been secured in the terminal; and picking up the parcel from the terminal.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE EMBODIMENTS

Figure 8:
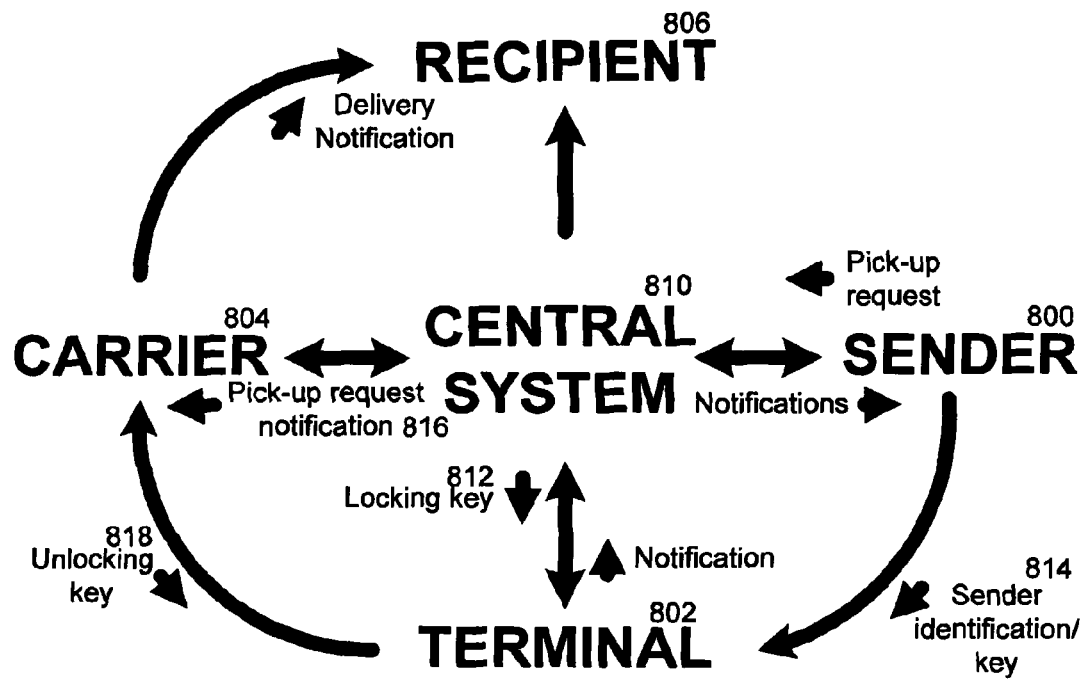
FIG. 8 shows a flow chart of the routing of a parcel and related shipping information from a sender to a recipient by use of a terminal and carrier according to exemplary embodiments.
Figure 14:
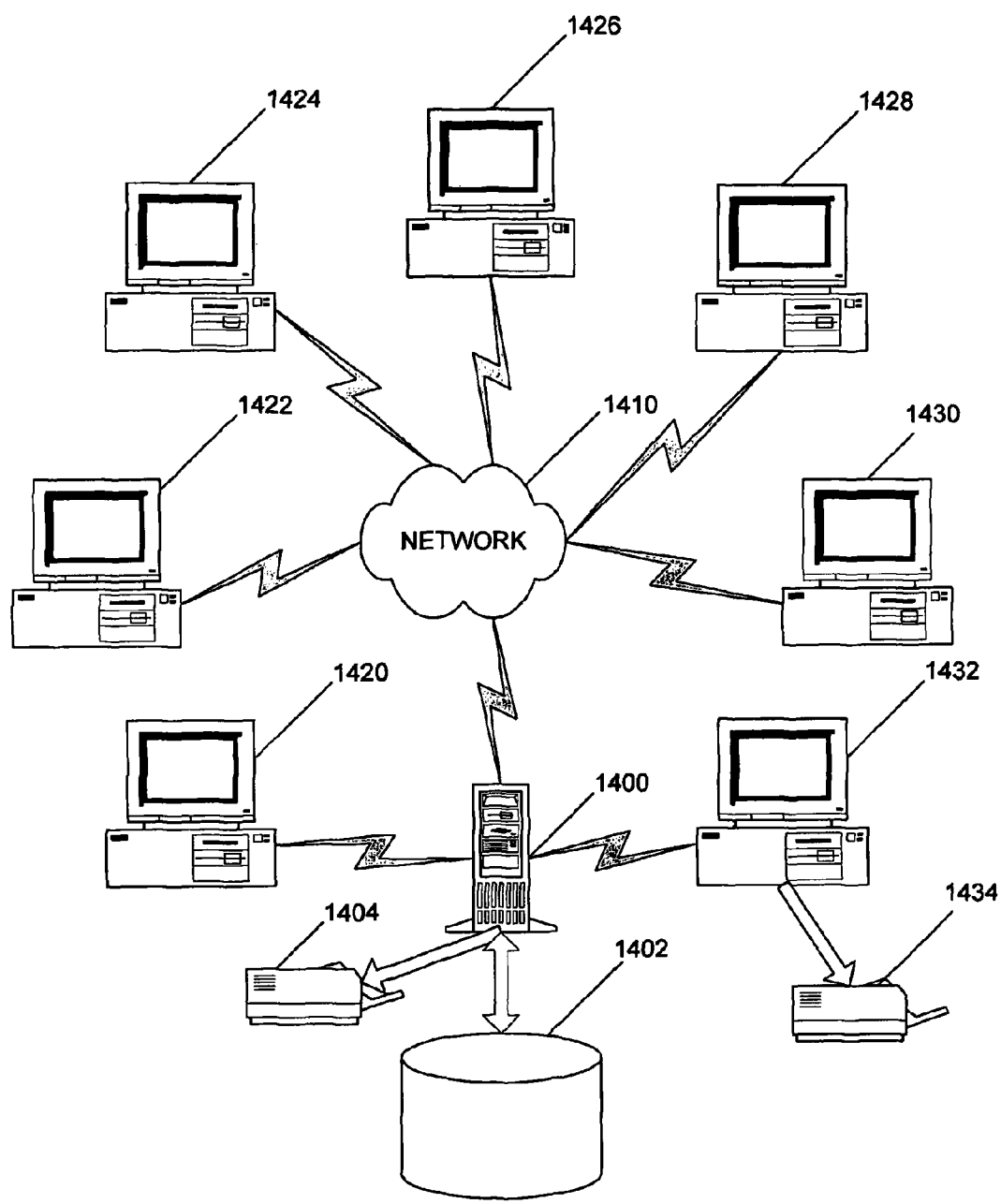
FIG. 14 shows a component diagram of a computer-based system for shipping and delivering a parcel to a virtual address according to an exemplary embodiment.

Referring initially to FIGS. 8 and 14, there is illustrated a computer-based system for shipping and delivering parcels to a recipient. While exemplary embodiments are described below for providing a parcel to a recipient 806, the system and method of the invention are not so limited. Embodiments of the invention can be easily extended by persons of skill in the art, in conjunction with the present description of the invention, to the providing of many diverse items to one or more recipients 806, said items including without limitation, letters, boxes containing property, vehicles, animals, and the like.

These and other aspects of the parcel shipping and delivery system and method will now be described in greater detail in connection with a number of exemplary embodiments. To facilitate an understanding of the embodiments, many aspects are described in terms of sequences of actions to be performed by elements of a computer system or apparatus as shown in FIG. 14. It will be recognized that in each of the embodiments, the various actions could be performed by specialized circuits, by computer program or computer product instructions being executed by one or more processors, or by a combination of both. Moreover, embodiments can additionally be considered to be embodied entirely within any form of computer readable storage medium having stored therein an appropriate set of computer instructions that would cause a processor to carry out the techniques, methods, and steps described herein.

FIG. 14 shows a central computer 1400 of the central shipping and delivery system 810 connected across a network 1410 to one or more terminals 1420-1432. While six terminals are shown, any number of terminals can be connected to the central computer 1400. Further, while an exemplary embodiment considers the terminals communicating with the central computer 1400 across a network 1410, any number of known communications systems, including hard-wired connections, local wireless networks, intranets, and the Internet, can be used to provide communications and the flow of information between the central computer 1400 and one or more terminals 1420-1432 without detracting from exemplary embodiments.

Each of the computers 1400 and 1420-1432 have one or more processors for the processing of software instructions, for processing input information, for analyzing information, for automatically making decisions, and for creating output information. The exemplary computers 1400 and 1420-1432 are not limited to traditional desk-top computers or laptop computers. Processing, communicating, and data transmitting and receiving functions can be implemented in a number of electronic devices within embodiments covered by the present concepts. For example and not limitation, one or more of the exemplary computers can comprise cellular telephones and/or personal digital assistants, including blackberry-type devices; and the computer users communicate through the computers using known electronic user interfaces.

Computer-executable instructions, or software, are provided for directing the processing of the computers 1400 and 1420-1432, including processing the steps of exemplary embodiments of the parcel shipping and delivery system. The computer-executable instructions, when executed by the computers 1400 and 1420-1432 and/or the processors associated with each of said computers, provide for the optimized and efficient shipment and delivery of one or more parcels to a recipient. One or more storage devices 1402 are provided for storage of information utilized in the shipment and delivery of parcels. The software can be stored on the storage devices, can be loaded into the memory of the computers, or can be stored onto separate storage means within the computers. Further, the software can comprise separate programs and sets of instructions or can be combined into a single program, set of instructions, or program module. Means for supporting a computer-based system for shipment and delivery of parcels to a recipient 806 include the computers 1400 and 1420-1432 and their respective processors and storage devices, along with the software, or computer instructions, for directing the computers and/or processors to process sender, carrier, and recipient information and to direct shipment and delivery of a parcel to a recipient 806 based on the sender 800, carrier 804, and recipient 806 information. In addition, communication devices and networks are means for notifying a central computer 1400, senders 800, carriers 804, and recipients 806 with information regarding the shipment and delivery of parcels. Further, locking devices on the doors of drop-boxes provide means for locking the drop-boxes. Information and records associated with the shipment and delivery of parcels can be recorded on the storage devices 1402, displayed on the screens of the computers 1400 and 4120-1432, and output, such as on the exemplary printers 1404 and 1434.

The functionality of an embodiment for efficiently shipping and delivering a parcel to a recipient 806 can be shown with the following exemplary flow description:

Shipping and Delivering a Parcel to a Recipient:
  Having a parcel with an address to be shipped.
    Determining if the parcel has a virtual address or a conventional address.
      If the parcel has a virtual address, routing the parcel through the dynamic optimization shipment system.
        Determine a first carrier and a first estimated time of arrival ("ETA").
        Update the system ETA.
        Determine intermediate carriers and intermediate ETA's.
        Determine a final carrier and a final ETA.
        Determine the delivery node and provide the delivery node with pick-up authentication information.
        Deliver the parcel to the delivery node and notify the system of the delivery.
        Notify the recipient of the delivery and the location of the node.
        The recipient provides the node with authentication information to obtain the parcel from the node and obtains the parcel from the node.

An exemplary system comprises a network of controlled, safeguarded, interconnected terminals or nodes together with a central computer system 810 and a cryptographic identification system to improve the economics and perceived quality of service of the first (shipping) and the last (delivery) segments of the transportation chain extending from the sender 800 to the recipient 806 of a parcel. Also included within the exemplary embodiments is a method, or process, to ship a parcel from a drop-point connected to a network of drop-points ("network-originated" parcel) and to receive the parcel through a drop-point connected to a network of drop-points ("network-terminated" parcel). The method provides that all users are provisioned with digital credentials capable of unequivocally identifying each user.

Figure 7:
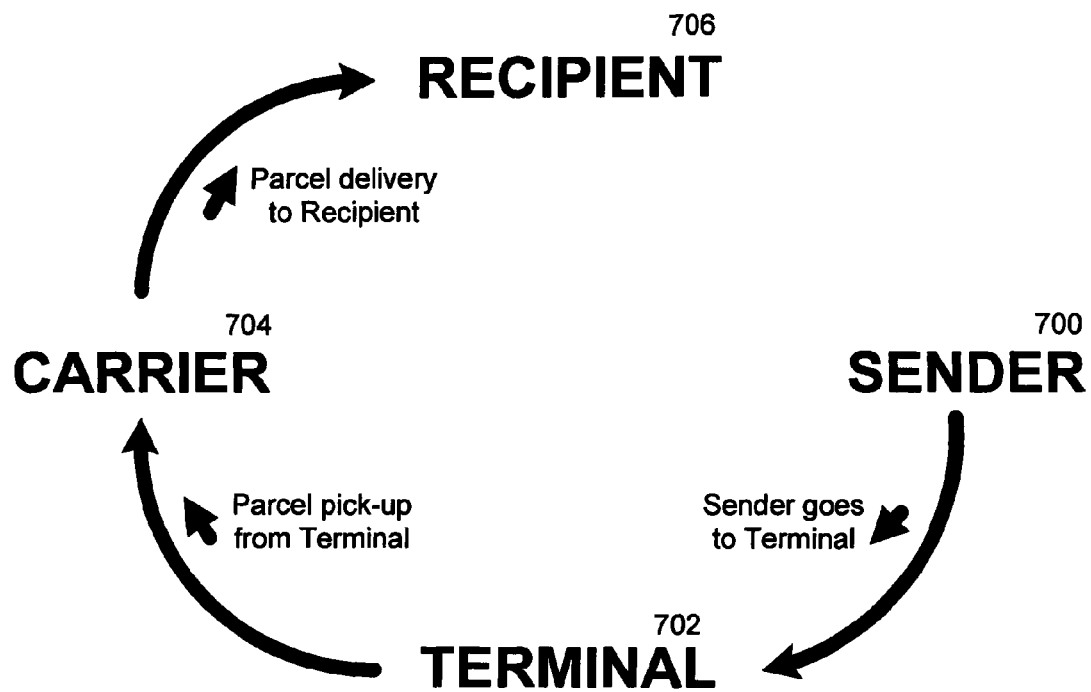
FIG. 7 shows a flow chart of the routing of a parcel from a sender to a recipient by use of a terminal and carrier according to a prior art postal system.

According to exemplary methods, and referring to FIGS. 7 and 8, some of the activities performed by senders 700 in prior art shipping systems are shifted herein to carriers 804 and some of the activities performed by carriers 704 are shifted to recipients 806. The result is lower variances in the shipment process and in fewer non-value-added activities, thereby reducing the total cost of shipping and delivering a parcel to a recipient 806. In particular, the sender 800 does not have to carry the parcel to a carrier's "shipping point." Instead, the sender 800 reserves one or more boxes at a terminal 802 for shipment and places the parcel to be shipped in a reserved box. The sender 800 locks the box using a cryptographic mean. The carrier 804 is then notified of the status of the terminal 802 and picks up the outbound parcel. Analogously, the transportation chain is concluded not by having the carrier 804 deliver to the recipient's premises but to instead deliver to a terminal specifically reserved for the receipt of the sender's parcel. The recipient terminal is then locked using a cryptographic mean and can only be opened by the intended recipient 806 using another cryptographic mean. Since both endpoints are controlled by a central system 810, and their status is known in real-time, there is no variance in the method. For example, parcels can be placed in secured boxes for shipment at any time by a sender 800, and the delivery notification of the parcels to the recipient 806 can be effected as soon as the parcels are secured in the boxes of the terminal.

Reservation of a box in a node is for a limited time only, whether the box has been reserved to receive a parcel to be shipped or whether the box has been reserved by the system to hold a parcel until the recipient picks up the parcel. Removal of the parcel effectively terminates the reservation and renders the box available to the shipping and delivery system again. While only one terminal 802 is shown in FIG. 8, and the terminal 802 is shown as part of the sender to carrier leg, a corresponding or same terminal 802 can be utilized by the carrier 804 to deliver the parcel to a secured box for pickup by the recipient 806. Exemplary embodiments provide for terminals 802 being used interchangeably and simultaneously as depositories for securing parcels to be picked up by carriers 804 for shipment and for securing parcels delivered by carriers 804 for pickup by recipients 806. Such carrier pickup terminals and recipient pickup terminals can be simultaneously referred to by the element number 802.

Exemplary embodiments introduce an information and processing layer between the recipient of a parcel and a legacy, or conventional, delivery infrastructure. The information and processing layer performs four tasks: (1) it acquires and identifies the virtual address of the recipient, (2) it validates the virtual address, (3) it authorizes the delivery from the sender to the recipient, and (4) it converts the virtual address into a physical postal address as specified by the recipient in her user profile.

The virtual address is a combination of a string of alphanumeric characters univocally associated with each recipient 806, as will be discussed in more detail in association with FIG. 12. This personal recipient information can include, but is not limited to, the recipient's first and last name and city of residence and a control mechanism such as, but not limited to, a hash of the aforementioned information or an error correcting code such as the Hamming Code. Using the virtual address, exemplary embodiments provide a bridge to the delivery infrastructure that allows the translation of the virtual address into a physical postal address as specified by the recipient 806, provides a method for returning the parcel to the sender 800 if the virtual address is not properly validated or if the sender 800 is not authorized to receive the parcel, and notifies the sender 800 of validation and authorization errors.

A customer can be either a sender 800 or a recipient 806 or both. The customer becomes a subscription member of the shipping and delivery system and is then provisioned with digital identification credentials, optionally in the form of a plastic card or the like. As part of the customer initiation, she will create a virtual address and select preferences related to their shipping and delivery experience. One important preference is selecting her desired delivery nodes. She can select a primary node and multiple alternate nodes. She can also specify the times and/or days that deliveries are to be made to the primary node and when deliveries are to be made to any of the alternate nodes. The customer can update these preferences at any time to respond to her varying needs, preferences, and locations. The various carriers 804 are also provisioned with digital credentials to authorize their access to the shipping and delivery system and to access the boxes of the nodes 802.

Figure 1:
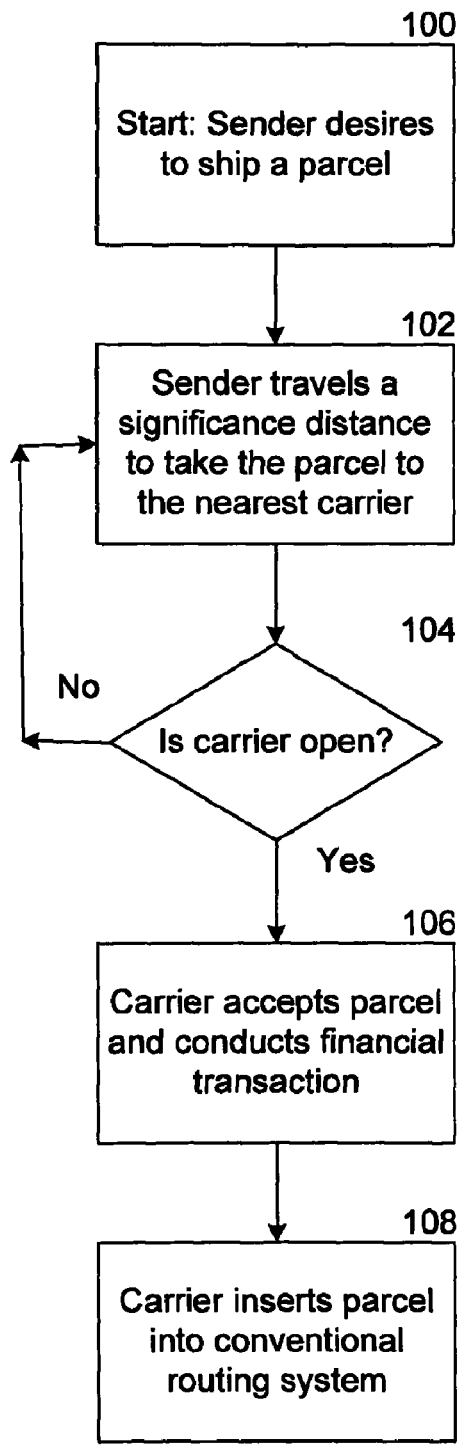
FIG. 1 shows a block flow chart of a prior art system for inserting a parcel from a sender into a transportation chain.
Figure 2:
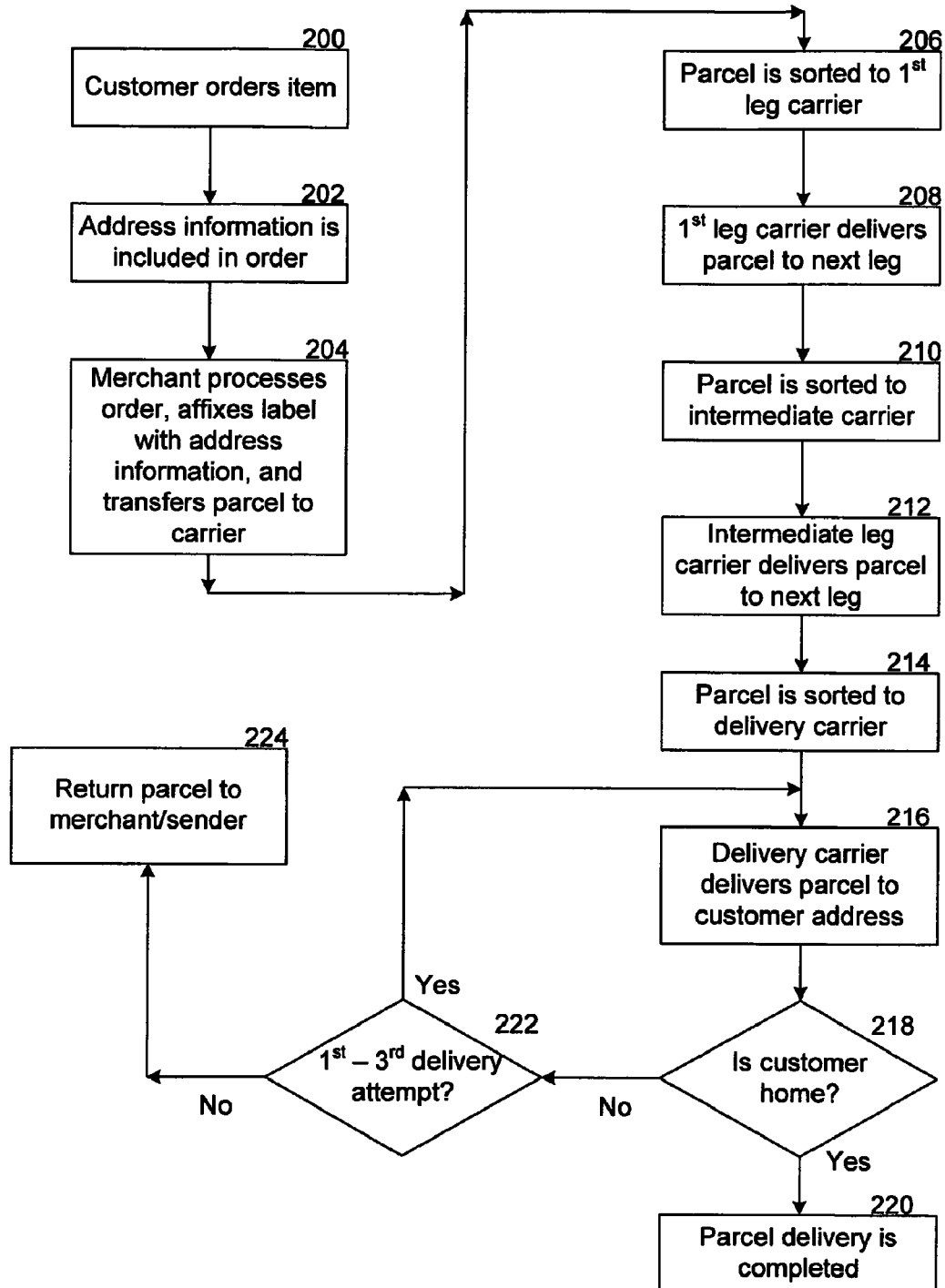
FIG. 2 shows a block flow chart of a prior art system for shipping, transporting, and attempting to deliver a parcel ordered from a merchant by a customer.
Figure 3:
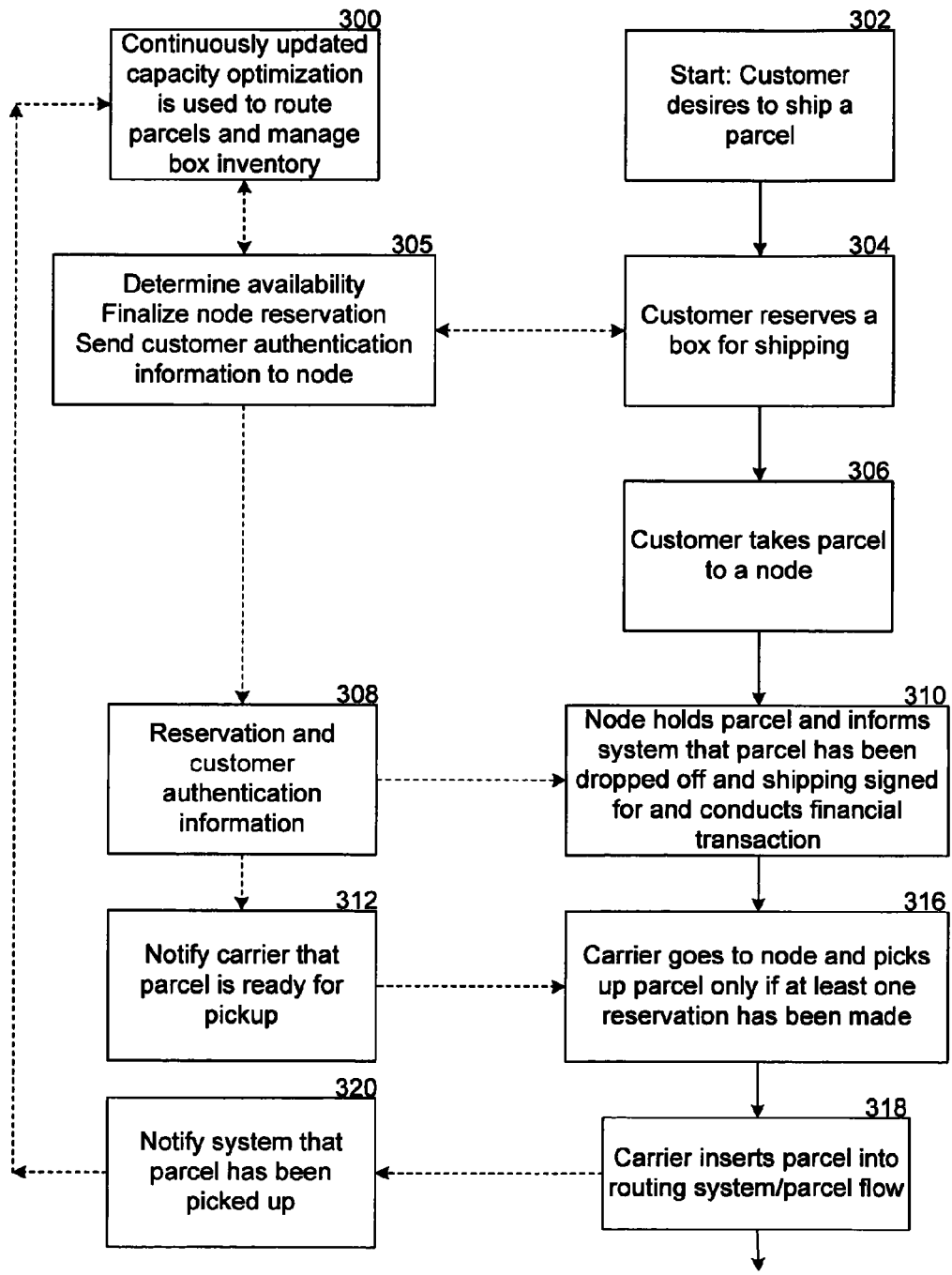
FIG. 3 shows a block flow chart of the movement of a parcel from a sender into the transportation chain according to exemplary embodiments.

Referring now to FIG. 3, there is illustrated a exemplary approach to parcel shipping that is in contrast to the legacy, prior art, method illustrated in FIG. 1. In this case the customer 800 who has a parcel to ship begins the process online by contacting the central system 810 at step 302. While exemplary embodiments provide for the customer/sender 800 contacting the central system 810 through a network, such as the Internet and/or a web site, the shipment process can also be initiated through a hard-wired connection to the central system 810 remotely or from the terminal 802 location. While connected to the central system 180, the sender 800 chooses the shipping options, orders the service, and prints the necessary label to affix to the parcel. She also reserves, at step 304, a box at a node convenient to her where she will leave the parcel for subsequent pickup by a carrier 804. In doing so the customer interacts with the computerized backend of the central system 810. This backend performs a number of specific functions that directly affect the shipping process. As shown in step 300, the backend maintains the status of each box at every node within a database that can be maintained on the storage device 1402. This database is queried by the system 810 at step 305 to provide the customer 800 a list of available boxes at a node selected by the customer 800. Once the customer 800 selects a particular node from which to ship and selects the number and size of boxes needed to hold the parcel(s) to be shipped, the system 810 then reserves the appropriate boxes at the selected node and updates the reservation state of those boxes in the database. The system 810 communicates the customer reservation information to the node at the terminal 802 via a wired or wireless communication channel. The node will utilize this information to interact with the customer 800 when she arrives at the node to drop off her parcel. This reservation information includes, but is not limited to, the customer's identification information, information on the box to which the customer's shipment has been assigned, the cryptographic keys necessary to validate the customer's identity at the node, and the cryptographic keys necessary to unlock the appropriate box when combined with the cryptographic key located on the customer's digital credentials.

At step 306 the customer 800 takes the parcel to the node where she has one or more boxes reserved. She interacts with the node to identify herself as being authorized to place a parcel in a designated box to enter the box into the shipping and delivery system. For example, the customer 800 can use a graphical user interface or some other input device at the node, such as a keypad, biometric scanner, smartcard reader, or the like, and authenticate herself to the node using her electronic credentials. One embodiment would be using a smartcard as the electronic credential whereby the smartcard holds the cryptographic keys necessary to interoperate with the node to unlock the appropriate box and to digitally sign that the custody of the parcel has been transferred from the customer 800 to the node.

Once the customer 800 has successfully identified herself at the terminal 802, the reserved boxes unlock, optionally signal to the customer 800 their availability, and the customer 800 places the parcel(s) in the designated box(es). The node notifies the backend system 810 at step 310 that the parcel has been delivered to the node. At this point the system 810 informs the carrier at step 312 that there is one or more parcels to be picked up at the given node. In one embodiment, the customer identification process takes place on the central system 810, with customer identification information being transmitted to the central system 810 from the node and box access authorization information being sent from the central system 810 to the terminal 802 at step 308. In an alternate embodiment, the central system 810 can communicate the appropriate customer identification information to the node as shown in step 308, which then authenticates the customer identification information entered by the sender 800.

The parcel at this point is locked in a container that has been physically and electrically secured and which is monitored for tampering. This allows for a secure chain of custody to be maintained for the parcel from the time it is dropped off by the customer 800 to the time that custody is legally transferred to the carrier 804.

At step 316 the carrier 804 arrives at the node to pick up the parcel for shipment. The carrier 804 first authenticates its identity to the node (either using an electronic credential similar to that of the customer, or some other means such as a wireless interaction with the carrier's handheld electronic device). Once the carrier 804 has been authenticated to the node the appropriate boxes for this carrier 804 to ship are opened, and the carrier 804 removes the parcels at which time (step 320) the system 810 will so be notified by the node and the opened boxes are relocked. The status of the parcels in the database 1402 will be updated to reflect that the parcels are now in the custody of a specific carrier, who will enter them into the carrier's legacy routing system for parcels.

The aforementioned terminal 802 or node describes a space for receiving the parcel and for securing the parcel for access by only the carrier 804 and/or recipient 806. The terminal 802 can comprise, for example and not limitation, one or more electronically lockable boxes or lockers at a drop-point in a merchant site such as a grocery store. Alternately, the terminals 802 can be located in convenience stores, gas stations, libraries, building lobbies, and the like, and can be accessible 24 hours a day, 7 days a week. An advantage of using terminals is their close proximity to the shipper due to being able to deploy the terminals with greater density than can be done with a retail outlet or a carrier distribution center. Additionally, the terminal 806 can be a large shipping container which is sized and configured to be placed on a truck, ship, train, and/or airplane. Further, the terminals can be designed to be connected together in modules to increase the number and density of boxes at a drop-point location. Each terminal and/or each module can be configured to comprise multiple box sizes. Each such module can be configured to operate and be identified to the central system 810 as a plurality of separate modules or as a single terminal 802 or node. The terminals 802 can be unmanned drop-points for the receipt and distribution of parcels with boxes that are time-shared rather than being customer-specific.

One embodiment of the drop-point locations can be a grouping of box-shaped containers, each having an electronically locking door and each connected to a number of common control units. The boxes and control units can be modular in nature allowing the setup of each drop-point location to be different and meet the needs of the specific location. In this embodiment, each box can be controlled by one or more of the control units. The control units communicate with the central system 810, provide a user interface, and communicate with the boxes to lock and unlock them after receiving the proper cryptographic key. The user interface can be a touch screen, digital alphanumeric display, key pad, or other device. The control unit can include a smartcard reader, magnetic card reader, optical scanner, Bluetooth module, or other device to read the cryptographic key of the user. The control unit can be connected to the central computer system 100 across the network 110 or across other wireless or wired communications means. The user includes the sender 800, the carrier 804, and the recipient 806, each of whom must successfully identify themselves to the shipping and delivery system to gain authorized access to the box space.

Each box can be controlled by one or more control units. While each box can be of sufficient size to accommodate common parcel sizes, exemplary embodiments can apply to container-sized boxes that can accommodate items as large as a vehicle, or larger. Each box can have an electronically controllable lock. Each box can, but is not required to, contain a sensing device that senses the presence and identity of the parcel. This sensing device can be in the form of, but is not limited to, a weight measurement pad, an optical scanner, or a radio frequency identification ("RFID") reader.

Figure 4A:
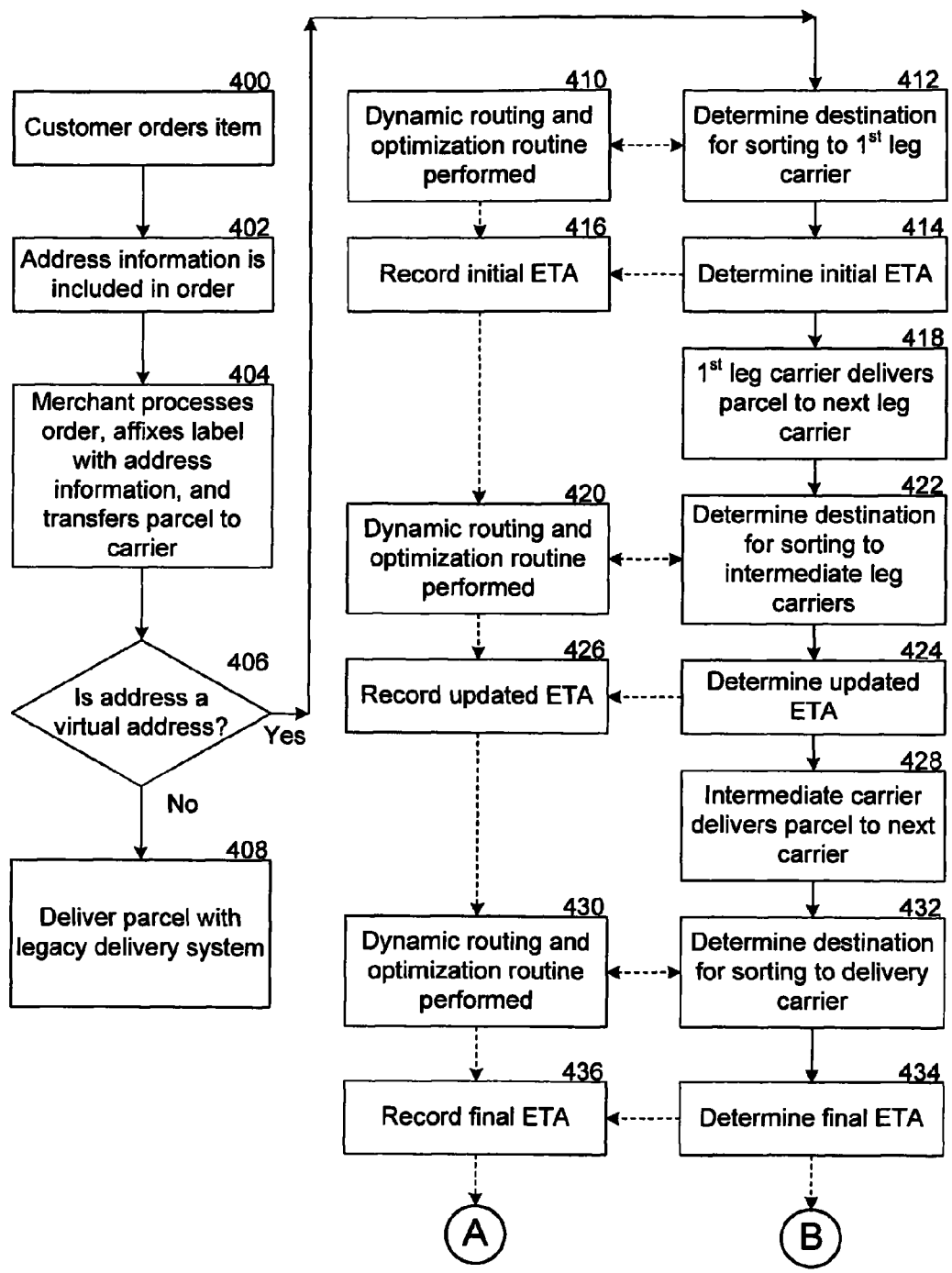
FIGS. 4A and 4B show a block flow chart of the movement of a parcel from a merchant through the transportation chain to the recipient according to exemplary embodiments.
Figure 4B:
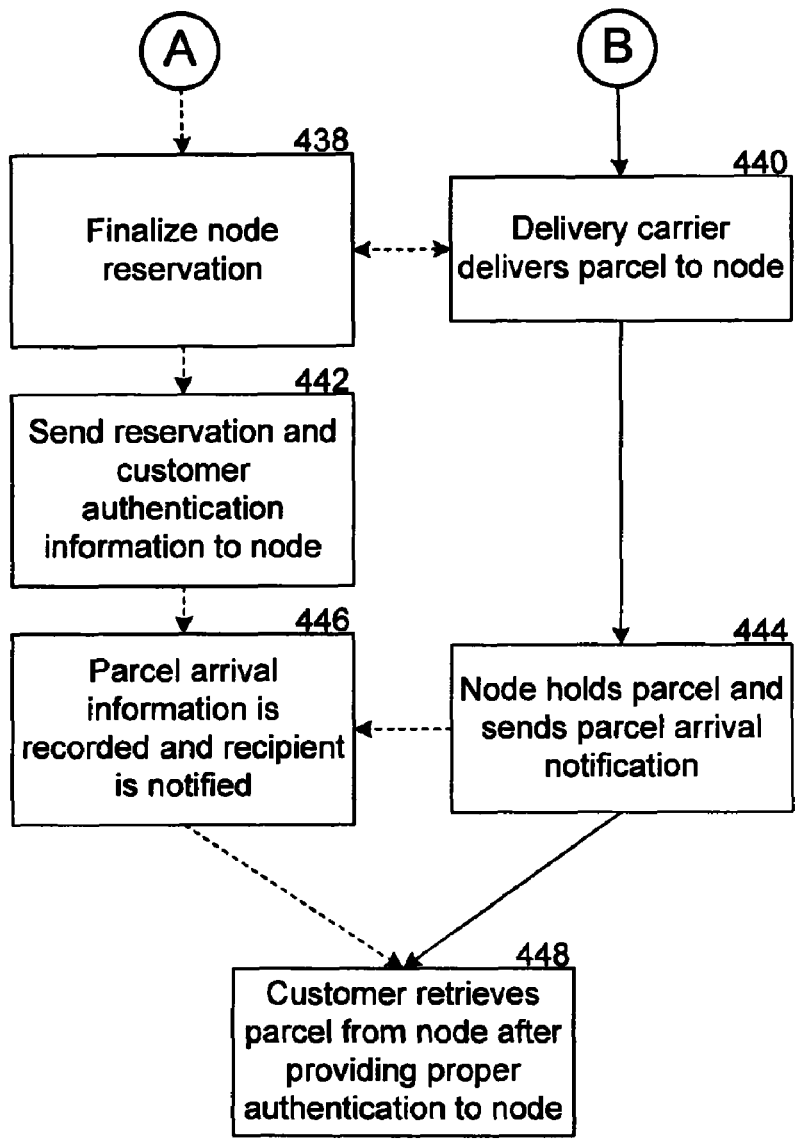

Referring now to FIG. 4, comprising FIGS. 4A and 4B, there is illustrated a block flow chart of the shipping and delivery of a parcel according to exemplary embodiments. FIG. 4 includes an embodiment where the customer has purchased a product online, such as through the Internet, and prefers the purchased product be delivered to herself or a third party recipient 806. In this embodiment, the customer 800 finds, purchases, and pays for the goods online. The customer 800 can optionally enter virtual address information in place of a postal address when prompted by the online merchant for the shipping address. While FIG. 4 is directed to circumstances whereby an online merchant is the sender 800 in steps 402 and 404, exemplary embodiments perform equally well when the sender 800 is not the merchant. In this latter embodiment, the shipment can originate from anywhere outside the network of nodes.

FIG. 4 also covers the embodiment where the sender 800 delivers the parcel to a node in the network, as was described above regarding FIG. 3. When the parcel originates in the network, such as for a long distance shipment, the parcel is transferred to a carrier 804 at step 318, which then transports the parcel according to steps 412-448. For short distance network originated shipments, the parcel can be transferred directly from step 318 to the delivery carrier at step 432 for delivery to a node per steps 432-448. Circumstances where the merchant delivers a parcel to the node 802 can occur where a customer has purchased a product at a retail outlet, and the merchant offers to have the product delivered to a recipient 806, whether the recipient 806 is the customer herself or possibly a gift recipient 806.

In the flow shown in FIG. 4, the purchase of a product by a customer over a network, such as the Internet, or at a retail outlet, as shown in step 400, can include address information at step 402, identifying where the product should be delivered. The recipient/destination address can be a conventional address which lists a recipient name, street address, city, state, zip code, and country where the product is to be delivered. By providing a conventional, or legacy, address format, the customer can signal to the merchant to ship the product according to a conventional, or legacy, delivery system, as shown in step 408. However, notwithstanding the decision process shown in step 406, exemplary embodiments do provide for the delivery of products to conventional addresses according to the steps, monitoring, control, and advantages of the shipping and delivery system disclosed herein and discuss below in conjunction with at least FIG. 4. The merchant can provide the parcel directly to a carrier 804 or can deposit the parcel in a node which is controlled and protected by the system 810, as discussed above.

Figure 12:
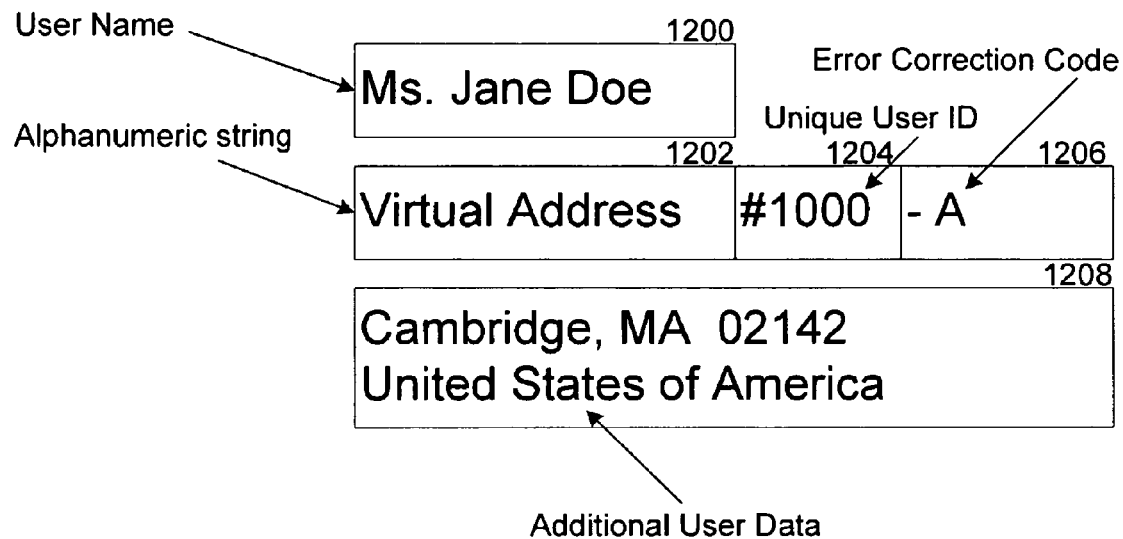
FIG. 12 shows an exemplary embodiment of a virtual address format.

The parcel destination address can, alternately, be a virtual address, as shown in FIG. 12 and as discussed in more detail below. When the carrier 804 receives a parcel addressed with a virtual address, he can query the system 810 to translate/compute the virtual address into the address of a terminal located near the recipient/destination and, alternately, to register the parcel with the system if the merchant has not utilized a shipment terminal 802 to identify the parcel to the system 810. Such a query can be accomplished through the interface(s) located at the terminal 802, through a communications link between the carrier 804 and the central system 810, through a hand-held device operated by the carrier 804, or the like.

Based on the destination terminal address, the carrier 804 can optionally provide the system 810 with an estimated time of arrival (ETA) for delivery of the parcel to the terminal 802. Also based on the destination terminal address and the time of carrier pickup, the central system 810 determines the routing of the parcel, including sorting the parcel to a first leg carrier, at step 412. The system 810 also determines and records, at steps 414 and 416, an initial ETA for delivery of the parcel to the terminal 802. The routing and the estimating of the ETA are accomplished through a dynamic routing and optimization routine being performed on the central system 810 at step 410 and discussed in more detail below in conjunction with FIG. 5. Through steps 418-436 the carrier(s) 804 and central system 810 interact to route the parcel and to estimate & record updated delivery ETA's for the parcel. In this manner, the parcel can be handled by one or more carriers 804 for the most efficient and timely routing and delivery of the parcel to the recipient 806.

The system 810 receives input from multiple sources, including comments from carriers and weather reports, to be able to route the parcel most efficiently and around transportation and weather problems. If a single carrier picks up the parcel from the terminal 802 and delivers the parcel to a terminal near the recipient 806, then steps 410-436 can be merged into few steps that eliminate the intermediate carriers 804. Ultimately, at step 432, the parcel is in the hands of the last mile carrier ("LMC"), or the carrier assigned the responsibility of delivering the parcel to the destination terminal 802. At step 438, one or more appropriately-sized boxes at the destination terminal 802 are reserved for receipt of the parcel from the carrier 804, the final node reservation information being provided to the carrier 804 for delivery of the parcel to the node at step 440. The node reservation can initially occur at step 412 in conjunction with the dynamic parcel routing performed by the central system 810, and the node reservation can be updated throughout the shipment process so as to maximize the effectiveness of the shipping and delivery system wherein multiple parcels are competing for box space in the terminals 802. The virtual address provides for the dynamic routing of the parcel based on the ETA and/or the options selected by the sender 800. For example, if the ETA is determined by the system 810 to be 10:00 am, the parcel can be routed to a first terminal as specified by the sender 800 through the virtual address. If the ETA results in being 2:00 pm, however because of, for example, transportation problems, the parcel can be automatically routed to a second terminal for pickup by the recipient 806, who is closer to the second terminal at 2:00 pm than the first terminal. Such a system also provides for the sender 800 and/or the recipient 806 to input, prior to shipment and/or prior to delivery, delivery address changes so as to dynamically route the parcel to the recipient 806.

Throughout this process of successive inquiries to system 810, the system 810 will use a utilization optimization model, as discussed below in conjunction with FIGS. 5 and 6, to determine the likelihood that a box will be available at the desired node. When the last mile carrier queries the system 810, the optimization model will then finalize the box assignment and communicate with the node at step 442 to reserve a box and provide the node with customer authentication information for accessing the node.

At this point the last mile carrier delivers the parcel to the node (step 440). Just as the sender 800 was required to identify herself to the terminal 802, the carrier must authenticate himself to the node with electronic identification and deliver the parcels to the designated boxes. The node will unlock only specific boxes to ensure that each parcel placed in its designated box for subsequent unlocking and access by specific, authorized recipients. For example, the carrier 804 can scan each parcel with a barcode scanner on the node. As each parcel is scanned and recognized by the system 810, its designated box will unlock. In alternate embodiments, the routine to recognize the parcel and unlock the reserved box can process on the central system 810 or on a processor on the node 802. Just as a single shipment can comprise multiple parcels and multiple boxes, a shipment can comprise multiple parcels to be placed in a single box. The electronic authentication performed between the carrier 804 and the node 802 will act as a signature that the custody of the boxes has been transferred from the carrier 804 to the node 802, which will so notify the system 810 at step 444, which in turn notifies the recipient 806 at step 446 that the parcel has been delivered to the terminal 802. The notification to the recipient 806 can be in the form of an email, voicemail, SMS, text message, or some other communication to inform the customer 806 that the parcel has arrived and is waiting at a particular node. Once a parcel has been placed in its reserved box, the box is locked, and the carrier 804 can scan the next parcel.

The parcel at this point is locked in a box that has been physically and electrically secured and which is monitored for tampering. This allows for a secure chain of custody to be maintained for the parcel from the time it enters the system either at a terminal 802 or with a carrier 804 to the time that custody is legally and physically transferred to the recipient 806. At step 448, the customer 806 will go to the node 802, authenticate her identity with her digital credentials, which unlocks the node box door, and retrieve her parcel. At this time, the node will inform the system 810 that custody has been transferred to the customer, and that there is now another unit of available box inventory at the node.

FIG. 4 also allows for an embodiment where the delivery carrier (LMC) is the only carrier integrated with the central computer system 810. In this case, the sender 800 sends the parcel with the virtual address embedded within the physical address of the delivery carrier, and the intermediate carriers deliver the parcel to the delivery carrier according to a legacy system. In this case only the delivery carrier acts as carrier 804, and the delivery process according to the exemplary embodiment begins at step 432 and continues through step 448.

Another exemplary case of FIG. 4 involves no carriers. In this case the sender 800 and the recipient 806 agree to use a specific terminal 802 to transfer a parcel. The terminal 802 is reserved by one of the parties, the sender 800 delivers the parcel to the terminal 802. The system 810 logs the receipt of the parcel and notifies the recipient 806 that the parcel can be picked up. Finally, the recipient 806 goes to the terminal 802 and picks up the parcel. In this case the sender 800 performs steps 302-310, the recipient 806 performs step 448, and the central system 810 performs steps 300, 305, 308, 420, 438, 442, 444, and 446. While the central system 810 does not calculate ETA's in this embodiment, the system still monitors terminal inventory, reserves drop-boxes, and sends notifications to the sender 800 and the recipient 806. The system 810 can also process the financial transaction regarding the parcel transfer at the time the sender drops off the parcel at step 306 or when the recipient 806 actually picks up the parcel at step 448.

Figure 5:
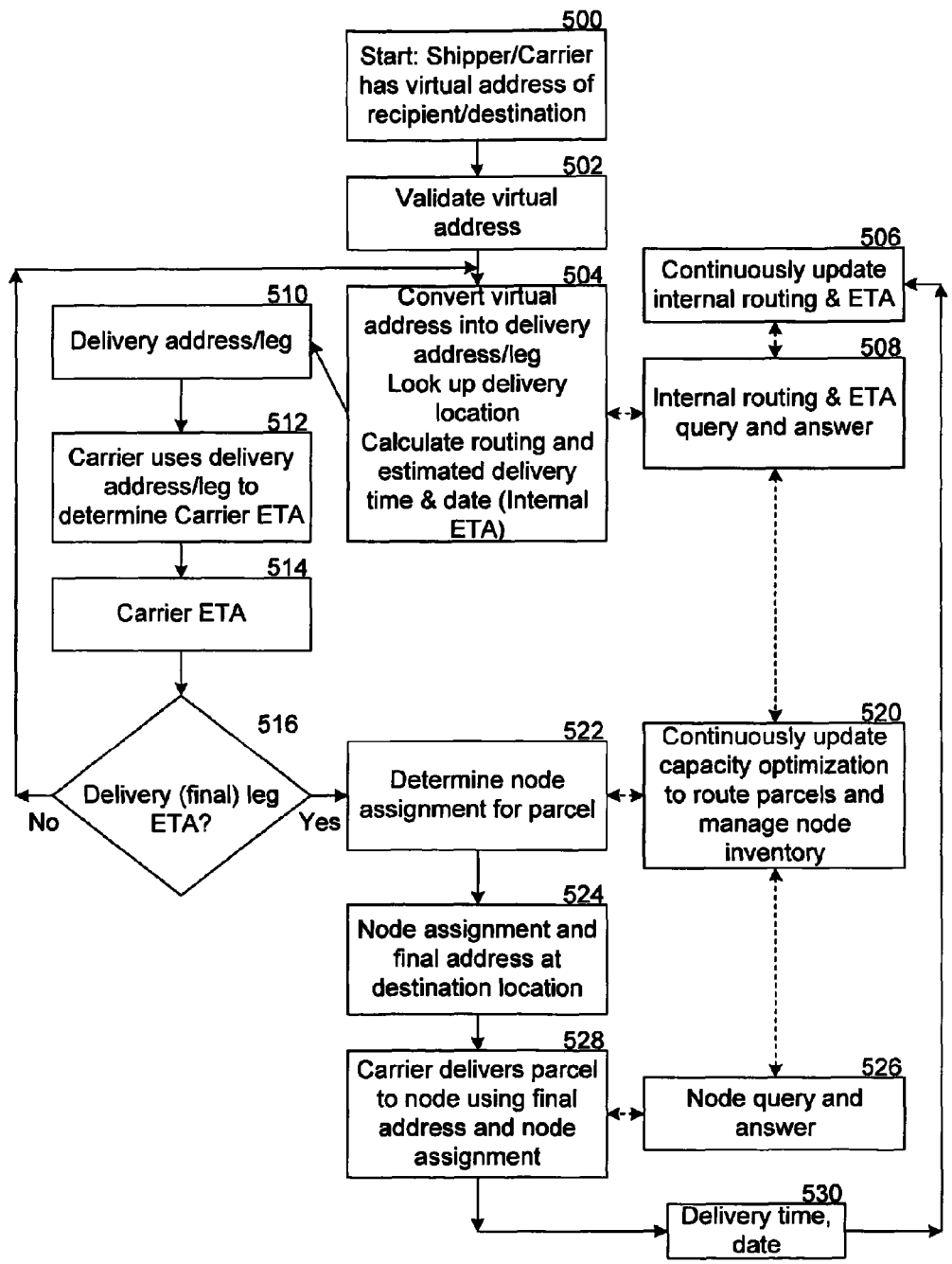
FIG. 5 shows a block flow chart of the use of a virtual address by a carrier and the use of capacity optimization for delivery of a parcel according to exemplary embodiments.

Referring now to FIG. 5, there is illustrated a flow chart of the use of a virtual address by a carrier 804 and the central system 810 and the use of a capacity optimization routine for delivery of a parcel according to exemplary embodiments. This process begins at step 500 with the carrier 804 having a virtual address to which to deliver a parcel. The system 810, at step 504, validates and corrects the virtual address (as discussed in more detail in conjunction with FIG. 13), converts the virtual address into a physical delivery address and/or a leg of the shipment routing, calculates the routing for the parcel, and computes an estimated delivery date and time ("internal ETA"). The routing and ETA of the parcel is continuously updated in step 506 as the system receives leg delivery information from the carrier 804 and transportation and weather information that can affect delivery of the parcel. This real-time information is available at step 508 for the system 810 to utilize in calculating parcel routing and ETA and for providing the information to the carrier 804.

As discussed above, the physical delivery address and the routing of the parcel are dependent on the ETA because the recipient 806 can be at a different location at a given date and time. In the simplest case the recipient 806 has only one delivery preference, which is to a nearby node of unlimited capacity. However, the customer 806 can have multiple delivery preferences depending on the time of week or time of day such as to a node near the customer's workplace during the week and to a node near the customer's residence during the weekend. It is also possible that the node is full at the ETA. In this case the parcel must be routed to an alternate node depending on the preferences of the customer 806. Both of these factors are taken into account by the central system 810 to provide as accurate as possible a delivery address to the carrier 804 given the uncertainty of the ETA at the time of shipment.

In addition to an internal ETA routine, the central system 810 also includes a continuously updated capacity optimization routine, as shown in step 520. This optimization routine uses information about scheduled deliveries, box availability, customer preferences, and customer history to determine where and how each parcel should be routed. The overall customer 800/806 experience is optimized by minimizing the number of times customers 800/806 have parcels delayed or delivered to an alternate node instead of their preferred node when there is no availability at the preferred node.

The physical delivery address and/or routing is transmitted to the carrier 804 at step 510, who uses the information to determine the carrier's ETA at step 514 and to transport the parcel to the next stage in the transportation chain. The carrier's ETA can be utilized within the carrier's legacy system for carrier planning and routing. The routing/ETA query will happen repeatedly—each time lowering the uncertainty of the ETA and therefore the delivery address—until the parcel reaches the last mile carrier 804 for the final leg. Note that the first carrier 804 can be the last mile carrier 804 in certain cases. In that eventuality, the carrier ETA can be used to finalize the node assignment for the parcel.

If the present delivery leg of the parcel delivery route is not the final leg, the routing and ETA for the parcel is updated, and the parcel is handed off to the next delivery leg, at steps 504-514. If the parcel is on the final leg, the carrier 804 queries the central system 810 at step 522 to determine the node 802 and optionally box assignment. The node 802 can also have received its assignment and allocation information from the central system 810 at step 524. In this manner the requisite box is reserved at the desired node 802 and is awaiting delivery by the carrier 804. The carrier 804 delivers the parcel to the node box, and the node 802 informs the central system 810 at step 530 the time the parcel was delivered. The delivery information is used at steps 506, 508, and 520 to reinforce the ETA routine.

Figure 6:
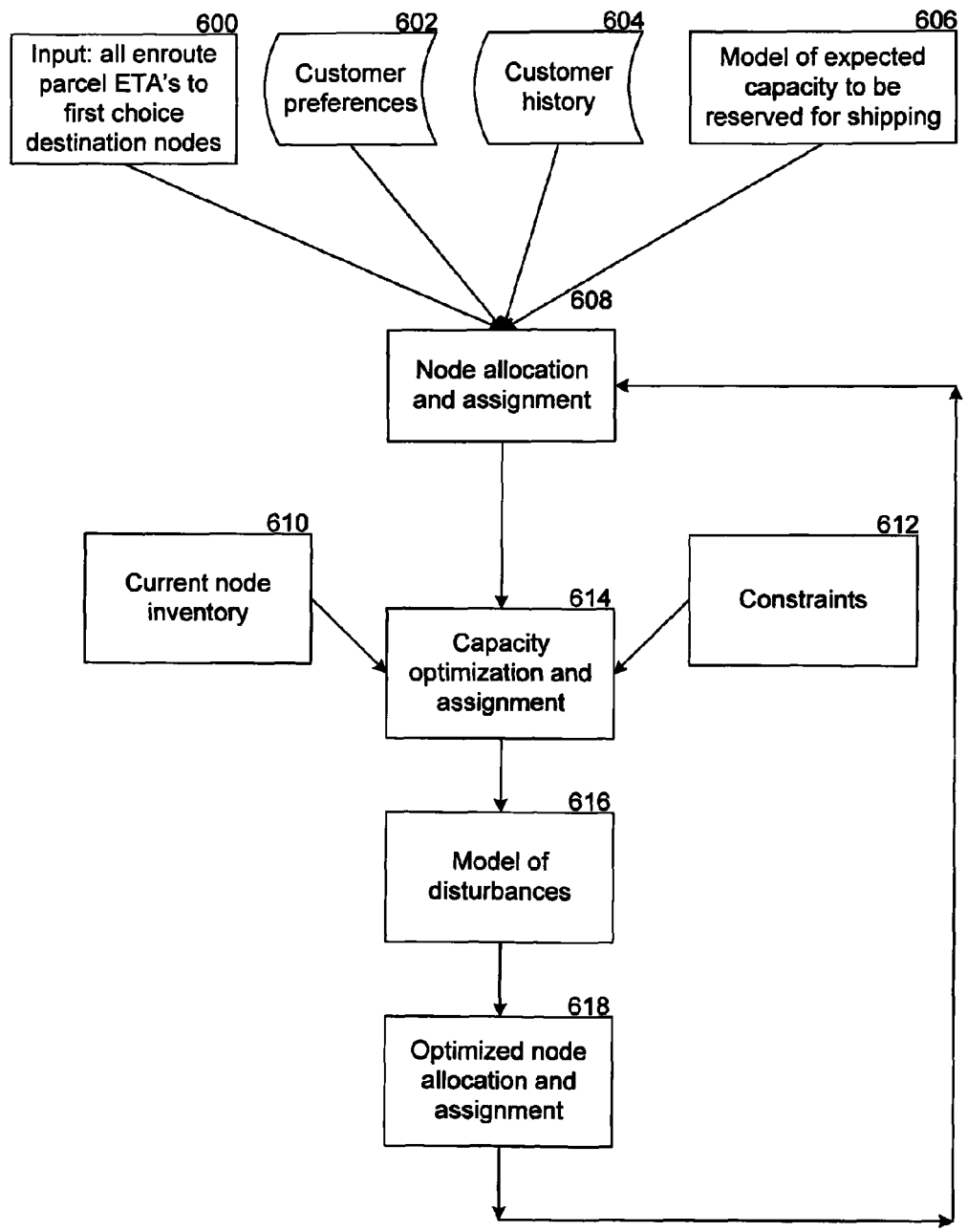
FIG. 6 shows a block flow chart of an embodiment of the capacity optimization of the exemplary shipping and delivery system.

Referring now to FIG. 6, there is illustrated an exemplary block diagram of the capacity optimization routine. This routine operates to maximize the customer experience by minimizing the number of times customers' parcels are delayed or sent to alternate nodes when a preferred node is full. This optimization routine can take the form of a linear programming optimization, but is not expressly limited to such a design. The routine is designed to, but is not required to, operate continuously so as to constantly input and monitor the operation of the shipping and delivery system to optimize node and box allocation and assignment and to maximize customer 800/806 preferences and expectations.

As shown in FIG. 6, the capacity optimization has multiple inputs and stages. Customer preferences 602, customer history 604, and a desired number of boxes to leave empty for shipping 606 are exemplary inputs to the assignment, allocation, and optimization routines. For instance, if a first customer had repeatedly experienced delayed parcel but a second customer had never experienced delays, then it would be worse for a parcel to the first customer to be delayed than it would be for a parcel to the second customer to be delays. Such historical information can be analyzed and decision variables can be developed by the central system 810 to adjust the operation of the optimization routine and control the assignment and allocation of the nodes and boxes. In this example, the system 810 uses this historical factor to assign a box to the first customer before assigning a box to the second customer, should only one box be available at the node. In this manner, the system 810 can determine which parcels deliver to preferred nodes and which parcels to delay or deliver to alternate nodes. Another variable input to the system 810 includes ETA information on all enroute parcels to their first choice destination nodes 600—i.e., the present demand on the system.

Based on the inputs, the system 810 makes a preliminary node allocation and assignment at step 608. Objective functions and constraints 612 are then applied to the assignment to optimize the allocation of nodes and boxes, as shown in step 614. An objective function represents a goal of the optimization process and can be used to weight the effect of the inputs to the process. For example, an exemplary objective function can be to add all of the parcels that are delayed or delivered to an alternate node under a given allocation. If a first set of optimization decisions produces a higher sum of such delays and alternate deliveries than does a second set, then the first set is viewed as being worse because it produces more delays and deliveries to alternate nodes, which is viewed as bad by the customer 800/804.

Another constraint to the allocation and assignment process is the number of available boxes for each node 610. The allocation decision process limits the allocation of boxes in each node according to the present node inventory. As nodes and boxes are added to the system and as nodes and boxes are unavailable for any reason, this inventory is constantly updated. The constraints act to modify the decisions made during the optimization and allocation processes.

Once the objective functions are formed and the constraints are input, the allocation and assignment process can be optimized mathematically to determine a set of decision variables that produces the most favorable assignment and reassignment of nodes and boxes. In one case, it would be the set of decision variables that results in the smallest number of secondary node assignments and the maximum number of box allocations per node. There are various mathematical routines and algorithms for determining this set of optimal decision variables, and a discussion of these methods is outside the scope of this patent, although this embodiment describes a Linear Programming method.

Some optimization methods can have uncertainty built into their algorithms. In recognition of such a mathematical element, the present system has a final element that is added to the result of the optimization function to quantify the effects of uncertainty. One way to accomplish this is to disturb 616 the objective optimization function in a way that represents uncertainties in the actual shipping and delivery process. For example, the likelihood of a carrier's delivery truck having a flat tire can be provided in step 616 to improve the certainty of the optimization process. By running the optimization process multiple times as shown in FIG. 6, the optimal set of decision inputs will vary with the uncertainty. From the resulting set of optimal solutions, the optimization/allocation solution that is produced most frequently or that is least susceptible to uncertainty can be chosen as the best optimal solution given the known uncertainty. Finally, the output 618 of this process is the optimal set of decisions given the current constraints and given uncertainty in the process. These decisions are then used to route parcels and allocate & assign nodes and boxes.

Referring now to FIG. 7, there is shown a block flow chart of a conventional, or legacy, prior art method for shipping a parcel by a sender 700 and delivering the parcel to a recipient 706, by dropping the parcel off at a terminal 702 and having a carrier 704 pick up the parcel at the terminal for delivery to the recipient. In an exemplary embodiment of the present system, as shown in FIG. 8, a sender, 800, connects to central system 810 and requests a parcel pick-up. The sender 800 is then assigned a specific drop-point, and optionally a drop-box at the drop-point, among a network of drop-points available through the central system 810 to be used to deposit the parcel. The central system 810, at this time, can require the sender 800 to specify the recipient's address or unique identifier. In another embodiment, the sender 800 can connect to the central system 810 from a sender-selected drop-point and request a pick-up. In response, the central system 810 assigns the sender 800 a box at the drop-point location. In either embodiment, the sender 800 receives from the central system 810 information necessary to access the assigned drop-box or, alternately, provides unique sender-related information for identifying herself to the central system 810.

The assigned drop-box is connected to the central system 810 and receives from the central system 810 an electronic locking key 812 via a wired or wireless data connection or other means. Only the intended sender 800 possesses the information or token or biometric profile or combination thereof needed to decode the locking key 812. In one embodiment, the locking key 812 is the recipient's public key generated by asymmetric cryptography methods; however, other digital keys can be used. The locking key 812 can be further encoded using digital keys issued to one or more carriers 804. In this manner, only the intended sender 800 can open the reserved drop-box and place her parcel inside.

The sender 800 brings the parcel to the reserved drop-point 802 in the drop-point network. The sender 800 holds a digital key 814 capable of unlocking the drop-box as well as generating a digital signature equivalent to conventional handwritten signature. The unlocking key 812 can be stored in a card (magnetic, microchip, smart, active, or other types of cards) or other devices capable of storing digital information. The sender 800 uses the unlocking key 814 as a proof of entitlement to place the parcel inside the drop-box. The sender 800 can designate other users of the system 810 to act on her behalf.

After the parcel has been delivered to the drop-box by the sender 800, the drop-box automatically locks using the digital key 812 previously delivered by the central system 810 or the one provided by the sender 814. The central system 810 acknowledges to the sender 800 that the terminal 802 has been properly locked and that the parcel has been received by the network for pick-up. The central system 810 then notifies the carrier 804 that a parcel is ready for pick-up in the form of a pick-up request notification 816 across the network/system 810. The carrier 804 receives the notification and goes to the terminal 802 to pick-up the parcel. The carrier 804 holds a digital unlocking key 818 capable of opening the drop-box as well of generating a digital signature equivalent to conventional handwritten signature. The carrier 804 uses the unlocking key 818 as a proof that it is entitled to pick-up the parcel.

The central system 810 can notify the sender 800 and/or the recipient 806 that the parcel has been picked-up from the drop-box by the carrier 804. The carrier 804 then delivers the parcel to the recipient 806 through conventional delivery systems (such as the postal system) or according to exemplary parcel delivery embodiments described herein.

Figure 9:
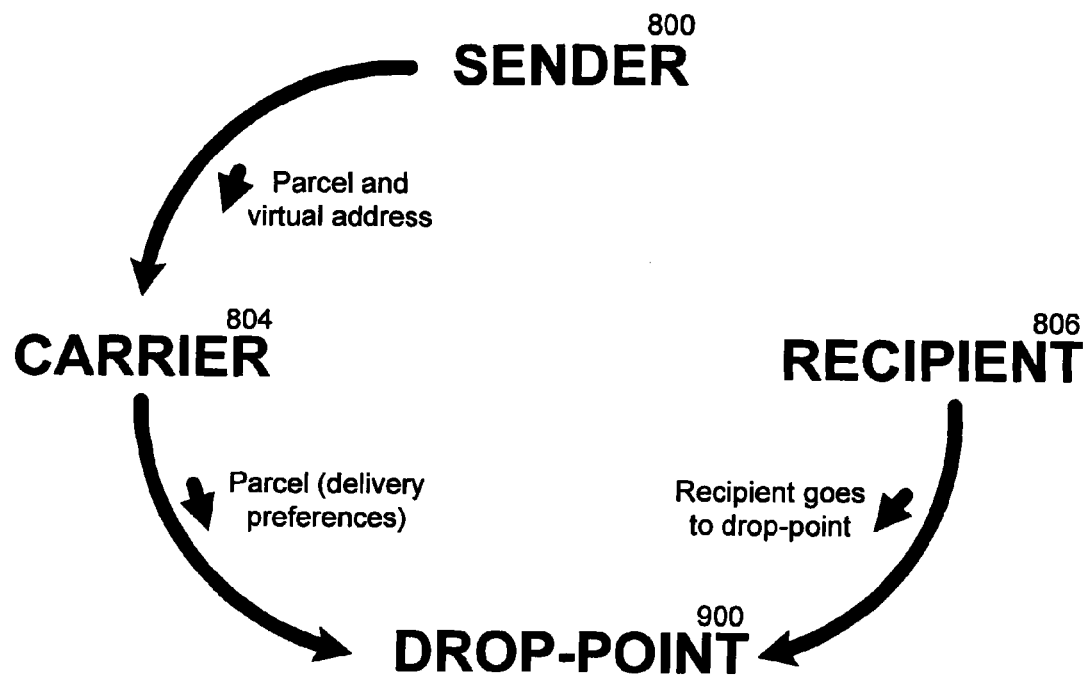
FIG. 9 shows a flow chart of the physical flow of a parcel from a sender to a recipient according to exemplary embodiments.
Figure 10:
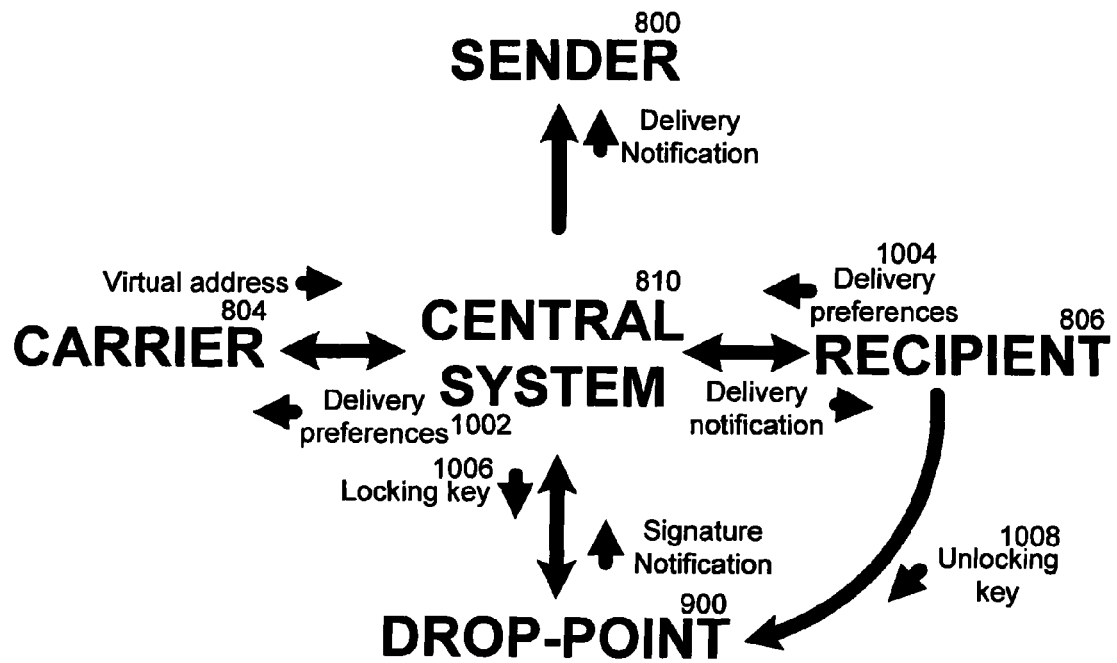
FIG. 10 shows a flow chart of the information flow in the transportation of a parcel from a sender to a recipient according to exemplary embodiments.

Referring now to FIGS. 9 and 10, there is shown the flow of delivering a network-terminated parcel to its recipient 806 through the usage of a connected drop-point 900 being part of a network of drop-points 900 according to exemplary embodiments. The sender 800 of the parcel addresses a parcel using a form of unique identifier of the recipient 806, such as the recipient's "virtual address", or the recipient's physical postal address. The carrier 804 receives the parcel from the sender 800 through conventional pick-up systems (such as the existing postal system), or by using the drop-location/drop-box system according to exemplary embodiments.

If a traditional postal address is used, the postal address will identify the drop-point. If a "virtual address" is used, the carrier 804 queries the central system 810 by providing an identifier univocally identifying the recipient 806 through the lookup "virtual address" method. The central system 810 returns either a delivery address 1002, based on user's delivery preferences 1004 or an error message. The central system 810 can notify the recipient 806 that a parcel is being processed at the carrier's warehouse and is going to be delivered to her preferred drop-point 900. If the central system 810 returns an error message, the parcel is returned to the sender 800.

If a traditional recipient postal address is used, or if the central system 810 returns a delivery address 1002, the carrier 804 delivers the parcel accordingly. According to exemplary embodiments, the delivery address 1002 corresponds to a drop-point 900 in a network of controlled, safeguarded, interconnected terminals for the delivery of parcels. The designated drop-box 900 is connected to a central system 810 and receives from the central system 810 an electronic locking key 1006 across the network via a wired or wireless data connection or other means. Only the intended recipient 806 possesses the information, token, biometric profile, or combination thereof needed to decode the locking key 1006. In one embodiment, the locking key 1006 is the recipient's public key generated by asymmetric cryptography methods, but other forms of digital keys can be used. The locking key 1006 can be further encoded using digital keys issued to the carrier 804. After the parcel has been delivered to the drop-box 900 by the carrier 804, the drop-box 900 automatically locks using the digital key previously delivered by the central system 810, whether provided from the central system 810 or from the sender 800 through the central system 810.

After the parcel has been delivered to the drop-box 900, the central system 810 notifies the recipient 806 that the parcel is available for pick-up at the selected drop-point 900. The recipient 806 receives the notification and goes to the drop-point 900 to pick up the parcel. The recipient holds a digital key 1008 capable of unlocking the drop-box 900 as well as generating a digital signature equivalent to conventional handwritten signature. The unlocking key 1008 can be stored in a card (magnetic, microchip, smart, active or other types of cards) or other devices able to store digital information. The recipient 806 uses the unlocking key 1008 as a proof of entitlement to pickup the parcel. The recipient 806 can designate other users of the system 810 to pickup on her behalf.

Figure 11:
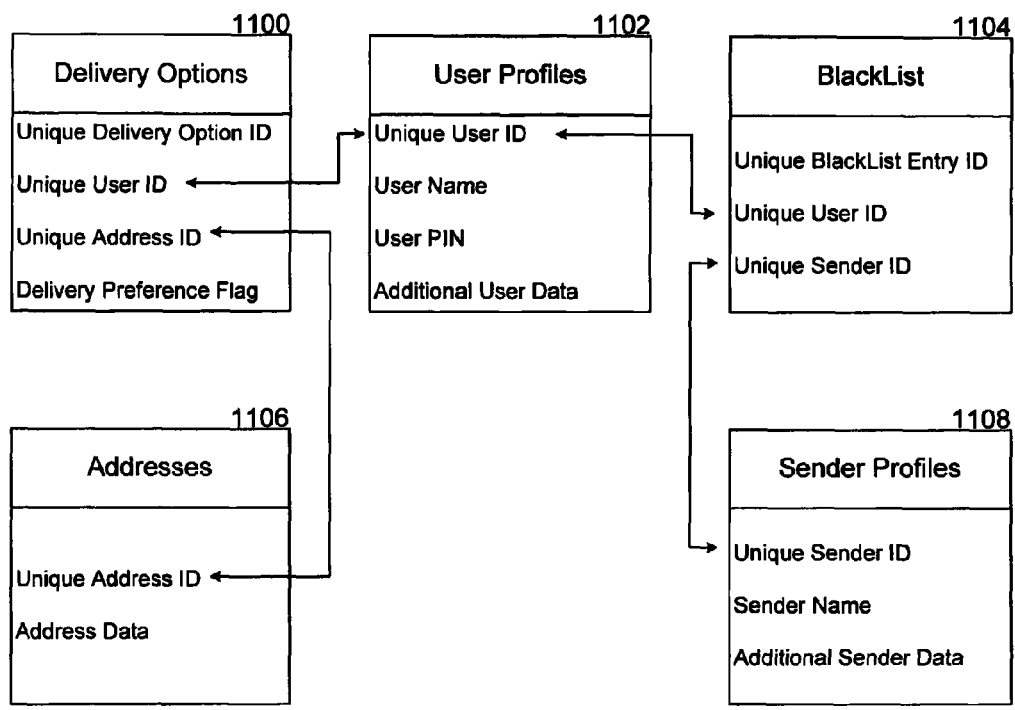
FIG. 11 shows an entity/relationship diagram illustrating an information structure according to exemplary embodiments.

The virtual address can be implemented with computer software on the central computer system 810. FIG. 11 shows the entity-relationship structure of a database representing one possible embodiment of the information structure part of the present system. In one embodiment, a system and method selects records from the following tables of a database: a recipients table 1102, a senders table 1108, an address table 1106, a delivery options table 1100, and a black-list table 1104. Referring to table 1102, the recipients table contains rows, with each row containing a unique user identifier, a username, a PIN or password, and additional user information. In one embodiment, additional user information can contain e-mail addresses, telephone numbers, instant messaging identifiers, or other user details. The user identifier can be a variable-length alphanumeric string that is unique for each user 806.

Referring to table 1100, each user 806 can specify one or more delivery options. One postal address corresponds to each delivery option. One embodiment stores delivery options and postal addresses in two distinct database tables to allow for better normalization of the information. The same information can be de-normalized and stored in a single table for greater speed. Each row in the table represents a delivery option and contains a unique identifier of the user who specified this delivery option and the identifier of the postal address identifier corresponding to this delivery option, and a Boolean (i.e. true or false or single bit) indicator/flag that identifies the delivery option currently selected as "active" by the user 806.

Referring to table 1106, each row in the table represents a postal address identified by an index. In one embodiment, the address data can include the recipient name and/or apartment, one or more address lines, city, state, province, zip code, and a country identifier.

Each user 806 can authorize specific senders (a.k.a. "white-list") or block specific senders 800 (a.k.a. "black-list"). In the case of a white-list, only authorized senders 800 (those on the "white-list") can translate the "virtual address" into the currently active delivery option and its corresponding address. In case of a "black-list", all senders 800 except those included in the list can translate the "virtual address" into the currently active delivery option and its corresponding address. Referring to table 1104, one embodiment comprises a black-list stored in a separate database table. Each row of the table is identified by an index/entry id and specifies that the user identified in the user id row/field does not authorize sender 800 identified in the sender id row/field. Referring to table 1108, one embodiment stores additional information about each sender 800 such as a name, contact information, e-mail address, or other data.

Another added benefit of the present virtual address system is allowing a customer to maintain their own privacy with regard to their address. It also allows re-routing of parcels that are in transit as well as allowing customers 806 to set up delivery preferences without having to change addresses. For instance if the customer 806 wanted to have a parcel delivered to her apartment building on Saturday but to her office building during the week, she need only give out her virtual address and set the preferences of that address so that the parcel is routed accordingly.

Referring now to FIG. 12, the virtual address contains the following elements: a user name field 1200, an arbitrary alphanumeric string 1202, an alphanumeric code 1204 uniquely identifying the user, a form of error correction code 1206, and optional additional user information, 1208. In one embodiment, the user name field 1200 corresponds to the concatenation of the appellative title for the user 806, the user's first name, and the user's last name. The arbitrary alphanumeric string 1202 is any combination of characters, including no character. The alphanumeric code 1204 identifying the user 806 can be a machine-generated numeric code. The error correction code 1206 can be a checksum digit of fields 1200, 1204, and 1202. The additional user information 1208 is the concatenation of the city, zip code, state, and country associated with the user profile. In this embodiment, elements of the virtual address can be associated with fields present in the user table 1102, described in the information structure presented above in FIG. 11. The relationship between the various components of the virtual address is used in the method presented above and portrayed in FIG. 12 to enable and improve the efficacy of the virtual address translation into the correct postal address. The virtual address is known to the sender 800 and is inscribed on the mail piece in either human readable form or machine readable form or both.

Figure 13:
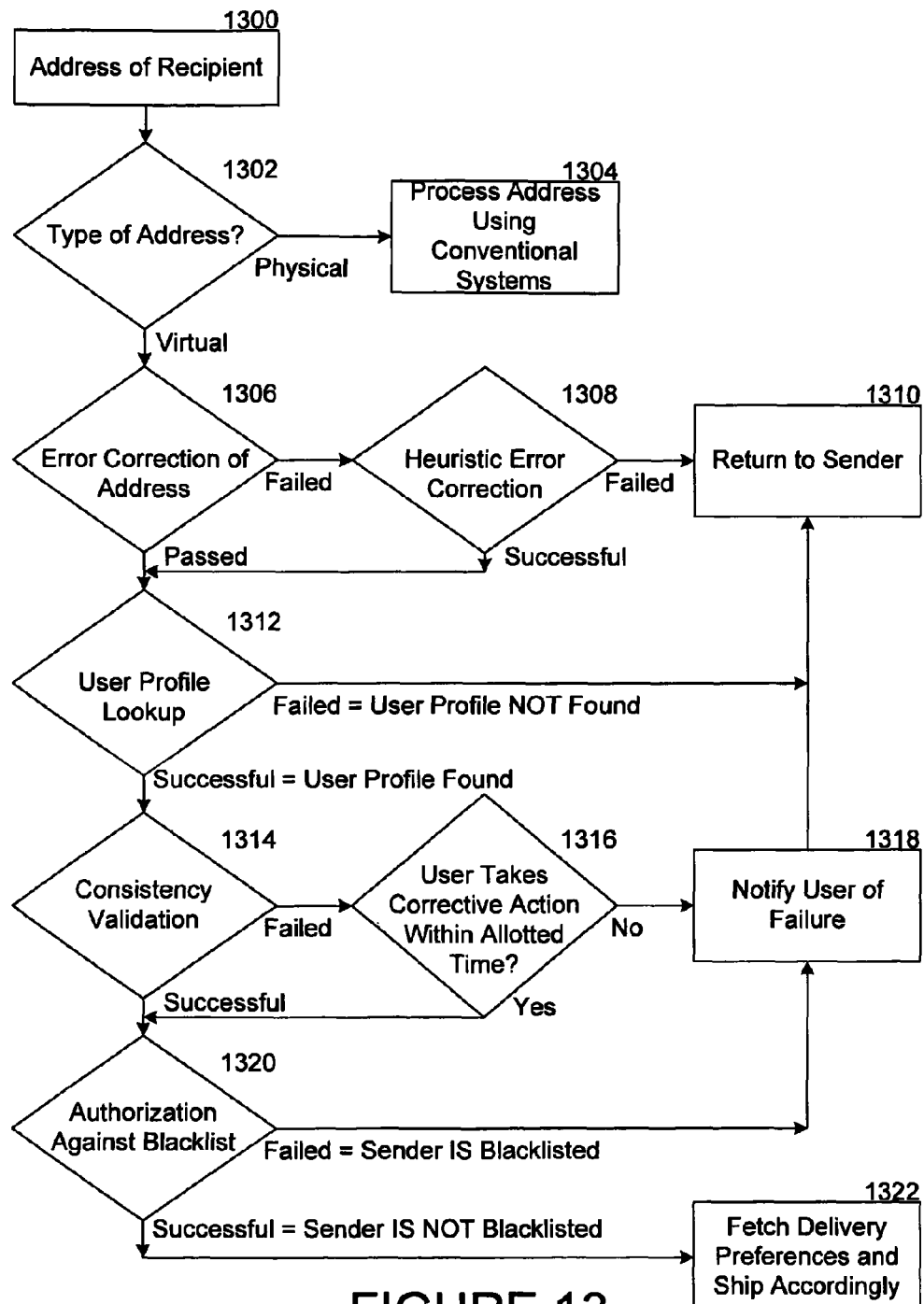
FIG. 13 shows a block flow chart of an exemplary method for identifying, validating, and authorizing a virtual address, and for converting a virtual address into a physical mailing address.

Referring now to FIG. 13, there is shown an exemplary method to identify, validate, and authorize a virtual address, and to convert the virtual address into a physical postal address. The method is designed to be integrated with both conventional delivery infrastructures and exemplary delivery methods disclosed herein. The method hereby described is provided with the following input: a destination address (can be either a postal address or a virtual address) and a sender 800. In addition, the method has access to the information structure described above regarding FIG. 11.

In the first step 1302, the method acquires the destination address and parses it. If the address is recognized as a conventional postal address, then the mail piece/parcel is handed off to conventional delivery methods and infrastructure in step 1304. Conversely, if the address is recognized as a virtual address, then the address is validated as described below. In one embodiment, a system and method acquires and identifies a virtual address using a machine-readable format such as, but not limited to, barcodes. In another embodiment, the postal or virtual address is inserted manually by a human operator. In yet another embodiment, the postal or virtual address is identified by other automatic or manual systems and methods.

Address validation can be accomplished through several embodiments, as discussed below. A verification step 1306 provides for the virtual address being checked using the implemented error correction code (as described above) to ensure that the virtual address is formally correct. If the provided virtual address is correct, the method proceeds to the lookup step 1312 described below. Conversely, if the virtual address is found to be formally defective, the method attempts to correct it using a variety of procedural and heuristic techniques at step 1308. If such corrective method fails, the mail piece is returned to the sender 800 at step 1310. In another embodiment, data in virtual addresses are not encoded using error correcting codes, and the virtual address is passed to the lookup step 1312 without the error correction steps 1306 and 1308.

Once a virtual address has been acquired at step 1302 and properly validated at step 1306, the virtual address is checked against the user table (table 1102 in the structure described in FIG. 11 above). In one embodiment, only the unique user identifier enclosed in the virtual address is utilized for this purpose. In another embodiment, additional information included in the virtual address can be used in order to simplify or strengthen the identification of a corresponding user profile. Should no matching user profile be found, the mail piece is returned to the sender at step 1310. Conversely, if a corresponding user profile is found, the method proceeds to the consistency validation step 1314.

Under the consistency validation step 1314, the data contained in the virtual address is checked against the data contained in the user profile identified in the lookup step 1312. In one embodiment, name, zip code, city, state, and country are contained in the virtual address and are checked against the corresponding information in the user profile. If the data in virtual address is consistent with the data stored in the user profile, then the method proceeds to the black-list authorization step 1320. Otherwise, the method notifies the user 806 at step 1316 with a request for corrective action regarding the inconsistent data. In one embodiment, such notification is sent across the network via electronic mail or instant messaging or other electronic communication channels by the computer system 810. In another embodiment, such notification is performed by a human operator through a phone call or others means of communication. In one embodiment, the user 806 can perform corrective actions on her profile using an Internet website or by calling a human operator who will perform such actions on the user's behalf. If corrective actions are taken within an allotted amount of time 1316, then the method proceeds to the black-list authorization step 1320. Otherwise, a failure message is sent to the user 806 at step 1318, and the mail-piece is returned to the sender 800 at step 1310. In one embodiment, the failure message is sent via electronic mail, instant messaging or other electronic communication channels by a computer system 1400, but other automatic or manual systems and methods can be used. In another embodiment, step 1316 can be omitted entirely.

In one embodiment, the method matches the sender identifier, given as input, and the user identifier, derived from the virtual address at step 1312. The resulting combination is checked against the black-list table 1104, and delivery is authorized at step 1322 only if a corresponding pair is not found. Conversely, if the pair is found in the blacklist table 1104, the user 806 is notified at step 1318; and the mail piece is handed off for return to the sender 800 at step 1310. In one embodiment, the failure message is sent via electronic mail, instant messaging or other electronic communication channels by a computer system 1400, but other automatic or manual systems and methods can be used.

The last step in the method is fetching the preferred delivery address at step 1322. In one embodiment, the method uses the information in the user profile 1102, fetched in the lookup step 1312 to derive the preferred delivery address by joining the delivery option table 1100 and the address table 1106. Such resulting postal address is then returned to the postal system and can be used to instruct the transportation of the mail piece.

The described system, processes, and methods include and implement the technical aspects and considerations of the computer/processor/network-based system and devices described herein and in the figures, whereby the unique processing, decision-making, information gathering and recording and transmission, and communications of exemplary embodiments work together for the effective shipment and delivery of parcels by senders to the virtual addresses of recipients. Accordingly, exemplary systems and methods as described herein provide a tangible and technical effect of securing, transporting, and delivering parcels from credentialed senders to authenticated recipients, based on the virtual address provided by the recipients and the optimized routing, allocation, and assignment of a central shipping and delivery system.

Although preferred embodiments of the present invention have been shown and described, it will be appreciated by those skilled in the art that changes can be made in these embodiments without departing from the principle and spirit of the invention, the scope of which is defined in the appended claims and their equivalents.

What is claimed is:

1. A computer-based method for shipping and delivering a parcel, comprising:
   receiving a parcel, the parcel having a virtual delivery address of a recipient comprising a user identifier, which comprises an alphanumeric string, and at least one of a recipient name and physical address data;
   converting, through a central computer system, using the user identifier, the virtual address into a postal address specified by the recipient;
   delivering the parcel to a destination corresponding to the postal address; and
   checking the recipient name or physical address data contained in the virtual delivery address on the parcel against data contained in a user profile and, if the data in the virtual delivery address is not consistent with the data stored in the user profile, notifying a user with a request for corrective action.

2. The method according to claim 1, further comprising notifying the recipient of the delivery of the parcel.

3. The method of claim 1, wherein the destination is a terminal drop-box, further comprising unlocking the drop-box only upon verifying the recipient's identity.

4. The method of claim 1, wherein the parcel is received in a terminal, further comprising reserving a terminal for the parcel.

5. A computer-based method for shipping and delivering a parcel, comprising:
   receiving a parcel, the parcel having a virtual delivery address of a recipient;
   converting, through a central computer system, the virtual address into a postal address specified by the recipient;
   delivering the parcel to a destination corresponding to the postal address;
   wherein the parcel is transported to a preferred delivery address based on the virtual address of the parcel, the transportation routing of the parcel is based on the virtual address of the parcel, an estimated time of arrival of the package is determined by a central computer system, and the preferred delivery address is based on the estimated time of arrival of the package,
   wherein the routing, estimated time of arrival, and delivery address are continuously updated in two or more ways selected from the following group:
      as the central computer system receives leg delivery information;
      as the central computer system receives transportation information;
      as the central computer system receives weather information; and
      based on a capacity optimization routine.

6. The method of claim 5, further comprising notifying the recipient of the delivery of the parcel.

7. The method of claim 5, wherein the destination is a terminal drop-box, further comprising unlocking the drop-box only upon verifying the recipient's identity.

8. The method of claim 5, wherein the parcel is received in a terminal, further comprising reserving a terminal for the parcel.

9. A computer-based method for shipping and delivering a parcel, comprising:
   receiving a parcel, the parcel having a virtual delivery address of a recipient, wherein the virtual delivery address comprises a user name field, an arbitrary alphanumeric string, an alphanumeric code uniquely identifying the user, and a form of error correction code;
   converting, through a central computer system, using the alphanumeric code, the virtual address into a postal address specified by the recipient; and
   delivering the parcel to a destination corresponding to the postal address.

10. The method according to claim 9, wherein the virtual delivery address further comprises additional user information.

11. The method of claim 9, further comprising notifying the recipient of the delivery of the parcel.

12. The method of claim 9, wherein the destination is a terminal drop-box, further comprising unlocking the drop-box only upon verifying the recipient's identity.

13. The method of claim 9, wherein the parcel is received in a terminal, further comprising reserving a terminal for the parcel.

14. A computer-based method for shipping and delivering a parcel, comprising:
   receiving, at a central computer system, a virtual delivery address of a recipient comprising a user identifier, which comprises an alphanumeric string, and at least one of a recipient name and physical address data;
   converting, through the central computer system, using the user identifier, the virtual address into a postal address specified by the recipient;
   transmitting a destination corresponding to the postal address; and
   checking the recipient name or physical address data contained in the virtual delivery address on the parcel, using the central computer system, against data contained in a user profile and, if the data in the virtual address is not consistent with the data stored in the user profile, notifying a user with a request for corrective action.

15. The computer-based method for shipping and delivering a parcel of claim 14, further comprising
   determining a user profile corresponding to the virtual delivery address by using a user identifier enclosed in the virtual address, and user name or address information included in the virtual address, to check the virtual address against a user table.

16. The method of claim 15, further comprising notifying the recipient of the delivery of the parcel.

17. The method of claim 15, wherein the destination is a terminal drop-box, further comprising unlocking the drop-box only upon verifying the recipient's identity.

18. The method of claim 15, wherein the parcel is received in a terminal, further comprising reserving a terminal for the parcel.

19. The computer-based method for shipping and delivering a parcel of claim 14, further comprising:
   checking the virtual address, through the central computer system, using an error correction code portion of the virtual address to ensure that the virtual address is formally correct.

20. The method according to claim 19, further comprising attempting to correct virtual address when finding it to be formally defective.

21. The method of claim 19, further comprising reserving a terminal for a parcel.

22. The method of claim 19, further comprising notifying the recipient of delivery of the parcel, and unlocking a drop-box only upon verifying the recipient's identity.

23. The method of claim 14, further comprising reserving a terminal for a parcel.

24. A method of claim 14, further comprising notifying the the recipient of delivery of the parcel, and unlocking a drop-box only upon verifying the recipient's identity.

25. A computer system encoded with computer software, which, when executed by a computer, provide for the shipment and delivery of a parcel, wherein the computer software is provided for:
   receiving a parcel, the parcel having a virtual delivery address of a recipient;
   converting the virtual address into a preferred delivery postal address specified by the recipient;
   instructing the transportation of the parcel to the delivery postal address;
   basing transportation routing of the parcel on the virtual address of the parcel;
   determining an estimated time of arrival of the package, wherein the preferred delivery address is based on the estimated time of arrival of the package; and
   continuously updating the routing, estimated time of arrival, and delivery postal address in two or more ways selected from the following group:
      as the central computer system receives leg delivery information;
      as the central computer system receives transportation information;
      as the central computer system receives weather information; and
      based on a capacity optimization routine.

26. The method of claim 25, wherein the software is further provided for reserving a terminal for a parcel and notifying a carrier that the parcel has been placed in the terminal.

27. The system of claim 25, wherein the delivery postal address is for a destination drop-box and wherein the software is further provided for notifying the recipient of the delivery of the parcel to the destination terminal drop-box and unlocking the destination drop-box only upon verifying the recipient's identity.

28. A computer-based method for shipping and delivering a parcel, comprising:
   receiving, at a central computer system, a virtual delivery address of a recipient comprising a user identifier, which comprises an alphanumeric string, and at least one of a recipient name and physical address data;
   converting, through the central computer system, using the user identifier, the virtual address into a postal address specified by the recipient;
   transmitting a destination corresponding to the postal address; and
   using the user identifier enclosed in the virtual address, and the recipient name or physical address information included in the virtual address, to check the virtual address against a user table.

29. The computer-based method for shipping and delivering a parcel of claim 28, further comprising
   checking the virtual address using an error correction code portion of the virtual address to ensure that the virtual address is formally correct.

30. The method according to claim 29, further comprising attempting to correct the virtual address when finding it to be formally defective.

31. The method of claim 29, further comprising notifying the recipient of the delivery of the parcel.

32. The system of claim 31, wherein the postal address is for a destination terminal drop-box, further comprising means for notifying the recipient of the delivery of the parcel to the destination terminal drop-box and means for unlocking the destination drop-box only upon verifying the recipient's identity.

33. The method of claim 29, wherein the destination is a terminal drop-box, further comprising unlocking the drop-box only upon verifying the recipient's identity.

34. The method of claim 29, wherein the parcel is received in a terminal, further comprising reserving a terminal for the parcel.

35. The computer-based method for shipping and delivering a parcel of claim 28, further comprising
   matching a sender identifier corresponding to a specific sender and user identifier derived from the virtual address against a black-list table and when a corresponding pair is found on the black-list table, returning the mail to the sender and notifying the recipient.

36. The method of claim 35, further comprising notifying the recipient of the delivery of the parcel.

37. The method of claim 35, wherein the destination is a terminal drop-box, further comprising unlocking the drop-box only upon verifying the recipient's identity.

38. The method of claim 35, wherein the parcel is received in a terminal, further comprising reserving a terminal for the parcel.

39. The computer-based method for shipping and delivering a parcel of claim 28, wherein the
   virtual delivery address comprises a user name field, an arbitrary alphanumeric string, an alphanumeric code uniquely identifying the user, and a form of error correction code.

40. The method of claim 39, wherein the virtual delivery address further comprises additional user address or name information.

41. The method of claim 39, further comprising reserving a terminal for a parcel.

42. The method of claim 39, further comprising notifying the recipient of delivery of the parcel, and unlocking a drop-box only upon verifying the recipient's identity.

43. The method of claim 28, further comprising reserving a terminal for a parcel.

44. The method of claim 28, further comprising notifying the recipient of delivery of the parcel, and unlocking a drop-box only upon verifying the recipient's identity.

45. A computer-based method for shipping and delivering a parcel, comprising: receiving, at a central computer system, a virtual delivery address of a recipient;
   converting, through the central computer system, the virtual address into a postal address specified by the recipient; and
   transmitting a destination corresponding to the postal address;
   wherein a preferred delivery address is based on the virtual address of the parcel, the transportation routing of the parcel is based on the virtual address of the parcel, an estimated time of arrival of the package is determined by the central computer system, and the preferred delivery address is based on the estimated time of arrival of the package, wherein the routing, estimated time of arrival, and delivery address are continuously updated on two or more basis selected from the following group:
      as the central computer system receives leg delivery information;

as the central computer system receives transportation information;

as the central computer system receives weather information; and based on a capacity optimization routine.

46. The method of claim 45, further comprising reserving a terminal for a parcel.

47. The method of claim 45, further comprising notifying the recipient of delivery of the parcel, and unlocking a dropbox only upon verifying the recipient's identity.

* * * * *